(12) United States Patent
Yoshio et al.

(10) Patent No.: US 8,948,385 B2
(45) Date of Patent: Feb. 3, 2015

(54) ELECTRONIC DOCUMENT ENCRYPTING SYSTEM, DECRYPTING SYSTEM, PROGRAM AND METHOD

(75) Inventors: Hitoshi Yoshio, Kahoka (JP); Seishi Sanada, Kahoku (JP)

(73) Assignee: PFU Limited, Ishikawa (JP)

( * ) Notice: Subject to any disclaimer, the term of this patent is extended or adjusted under 35 U.S.C. 154(b) by 826 days.

(21) Appl. No.: 12/532,768

(22) PCT Filed: May 31, 2007

(86) PCT No.: PCT/JP2007/061113
§ 371 (c)(1),
(2), (4) Date: Sep. 23, 2009

(87) PCT Pub. No.: WO2008/146392
PCT Pub. Date: Dec. 4, 2008

(65) Prior Publication Data
US 2010/0119067 A1 May 13, 2010

(51) Int. Cl.
*H04N 1/44* (2006.01)

(52) U.S. Cl.
CPC ............ *H04N 1/4486* (2013.01); *H04N 1/444* (2013.01)
USPC ............ 380/243; 380/244; 380/245; 380/246

(58) Field of Classification Search
CPC .. H04N 1/4486; H04N 1/32272; H04N 1/444
USPC ................................................ 380/243–246
See application file for complete search history.

(56) References Cited

U.S. PATENT DOCUMENTS 5,577,125 A * 11/1996 Salahshour et al. ............ 380/54
5,793,870 A * 8/1998 Conley ............................ 380/54
(Continued)

FOREIGN PATENT DOCUMENTS

JP 06-164951 A 6/1994
JP 08-179689 A 7/1996
(Continued)

OTHER PUBLICATIONS

David Hricik and Robert Jueneman: "The transmission and receipt of invisible confidential information", 6 pages, 2003.*
(Continued)

*Primary Examiner* — Catherine Thiaw
(74) *Attorney, Agent, or Firm* — Westerman, Hattori, Daniels & Adrian, LLP

(57) ABSTRACT

An electronic document encrypting system 200, for accomplishing an object of providing a system capable of distributing an electronic document containing important information with a browsing restriction being set and information with none of the browsing restriction being set without removing the important information, includes: an encryption area extracting unit 19 extracting an encryption target area from an electronic document; a digital image generating unit generating a digital image on the basis of the area extracted by the encryption area extracting unit in the electronic document; an encrypting unit 11 encrypting the digital image generated by the digital image generating unit 15 on the basis of an encryption key; and an encrypted electronic document generating unit 12 generating an encrypted electronic document in which when the electronic document is output, in place of the extracted information, an encrypted image encrypted by the encrypting unit 11 is output to an area to which the information extracted by the encryption area extracting unit 19 is to be output.

6 Claims, 36 Drawing Sheets

(56) References Cited

U.S. PATENT DOCUMENTS

| | | | |
|---|---|---|---|
| 6,178,243 B1 | 1/2001 | Pomerantz et al. | |
| 6,192,127 B1* | 2/2001 | Nagashima et al. | 380/201 |
| 6,373,947 B1 | 4/2002 | Pomerantz et al. | |
| 6,895,550 B2* | 5/2005 | Kanchirayappa et al. | 715/229 |
| 6,938,017 B2* | 8/2005 | Yen et al. | 705/62 |
| 7,043,686 B1* | 5/2006 | Maruyama et al. | 715/242 |
| 7,853,017 B2* | 12/2010 | Iizuka | 380/51 |
| 8,261,092 B2* | 9/2012 | Takenaka et al. | 713/189 |
| 8,290,160 B1* | 10/2012 | Steeger | 380/243 |
| 2002/0019934 A1 | 2/2002 | Ishizaki | |
| 2005/0091499 A1* | 4/2005 | Forlenza et al. | 713/176 |
| 2005/0154884 A1* | 7/2005 | Van Den Tillaart | 713/165 |
| 2005/0235163 A1* | 10/2005 | Forlenza et al. | 713/193 |
| 2005/0278378 A1* | 12/2005 | Frank | 707/104.1 |
| 2005/0289639 A1* | 12/2005 | Leung | 726/2 |
| 2006/0050926 A1* | 3/2006 | Iwamura | 382/100 |
| 2006/0075241 A1* | 4/2006 | Deguillaume et al. | 713/176 |
| 2007/0076868 A1* | 4/2007 | Ming | 380/54 |
| 2007/0076874 A1* | 4/2007 | Suleiman et al. | 380/243 |
| 2007/0150163 A1* | 6/2007 | Austin | 701/102 |
| 2007/0261099 A1* | 11/2007 | Broussard et al. | 726/1 |
| 2008/0084573 A1* | 4/2008 | Horowitz et al. | 358/1.13 |
| 2008/0263033 A1* | 10/2008 | Vailaya et al. | 707/6 |
| 2009/0214033 A1* | 8/2009 | Nakagata et al. | 380/243 |
| 2010/0049978 A1* | 2/2010 | Ogawa et al. | 713/170 |
| 2012/0121086 A1* | 5/2012 | Nakagata et al. | 380/243 |

FOREIGN PATENT DOCUMENTS

| | | |
|---|---|---|
| JP | 2938338 B2 | 8/1999 |
| JP | 11-511570 A | 10/1999 |
| JP | 2002-55608 A | 2/2002 |
| JP | 2002-084410 A | 3/2002 |
| JP | 2004-318391 A | 11/2004 |
| JP | 2006-080623 A | 3/2006 |
| WO | 97-09817 A2 | 3/1997 |
| WO | 2006-028103 A1 | 3/2006 |

OTHER PUBLICATIONS

International Search Report of PCT/JP2007/061113, Mailing Date of Aug. 21, 2007.

Japanese Office Action dated Jun. 25, 2013, issued in corresponding Japanese Patent Application No. 2009-516128, w/ English translation.

Notice of Reason for Rejection dated Feb. 26, 2013, issued in corresponding Japanese Patent Application No. 2009-516128, with English translation (5 pages).

* cited by examiner

FIG. 3

| MANAGEMENT NUMBER | · · · | NAME OF CLIENT | · · · |
|---|---|---|---|
| 12345678 | · · · | ○○CORPORATION | · · · |
| 23456789 | · · · | △△CORPORATION | · · · |
| 34567890 | · · · | ××CORPORATION | · · · |
| ⋮ | ⋮ | ⋮ | ⋮ |

301 — NAME OF CLIENT
302
300

(A)  (B)

(A)　　　(B)　　　(C)　　　(D)

ELECTRONIC DOCUMENT ENCRYPTING SYSTEM, DECRYPTING SYSTEM, PROGRAM AND METHOD

FIELD

The present invention relates to a technology of encrypting an electronic document.

BACKGROUND

A technology of dealing with encryption of a printed matter is exemplified by a technology of, at first, segmenting a whole image into a plurality of blocks, rearranging images of the segmented blocks based on parameters obtained from an inputted password (encryption key), further black-and-white-inverting and mirror-inverting the images of the blocks designated by the parameters, and thus encrypting the images (refer to Patent document 1). On the occasion of decrypting the encrypted image, a positioning frame is attached to the outside of the image, and, after inputting the password (decryption key), the encrypted image is decrypted into the original image through procedures reversed to those for the encryption.

Another technology is that black-and-white squares having a predetermined size, which represent binary data, are arrayed in matrix and embedded into the printed matter (refer to Patent document 2). Further, for recognizing visualized positions on the occasion of decryption, positioning symbols are attached to predetermined positions of the matrix on the printed matter. Based on these positioning symbols, the image is captured by a scanner and a camera, and the embedded information is decrypted.

[Patent document 1] Japanese Patent Laid-Open Publication No. 8-179689
[Patent document 2] Japanese Patent Publication No. 2938338

SUMMARY

A system, for acquiring and outputting an electronic document in a way that connects a client to a server, takes a means that previously removes confidential information etc from information transmitted to the client from the server as a means for preventing the important information etc from being leaked out.

In this type of method, however, a person having authority to access the confidential information etc tries to access this information, in which case the person separately needs to access the removed confidential information. Further, the access to the confidential information entails a procedure of undergoing authentication, separately, and an operation of decrypting the encrypted information is required in some cases.

The present invention, in view of the problem given above, aims at providing a system capable of distributing an electronic document containing important information with a browsing restriction being set and information with none of the browsing restriction being set without removing the important information from the electronic document.

The present invention adopts the following means in order to solve the problems given above. Namely, the present invention is an electronic document encrypting system comprising: encryption area extracting means extracting an encryption target area from an electronic document; digital image generating means generating a digital image on the basis of the area extracted by the encryption area extracting means in the electronic document; encrypting means encrypting the digital image generated by the digital image generating means on the basis of an encryption key; and encrypted electronic document generating means generating an encrypted electronic document in which when the electronic document is output, in place of the extracted information, an encrypted image encrypted by the encrypting means is output to an area to which the information extracted by the encryption area extracting means is to be output.

Herein, the electronic document connotes a document embracing some categories of information such as an electronized document, a graph and an illustration. The present invention enables the encrypted electronic document, of which an encryption target area is visually encrypted, to be generated by digitally imagizing the encryption target area in the electronic document and further replacing the digitally-imagized area with the encrypted image that has been encrypted.

Further, the electronic document encrypting system according to the present invention may further comprise keyword detecting means detecting a keyword contained in the electronic document by comparing a character string in the electronic document with the keyword defined as a predetermined character string, wherein the encryption area extracting means may extract an area associated with the keyword detected by the keyword detecting means from the electronic document.

According to the present invention, the area, presumed to be recorded with the important information in the digital image generated based on the electronic document, is automatically encrypted, and hence it is feasible to build up the electronic document encrypting system in which the optimal encryption target area is automatically selected only by designating the electronic document. Note that the keyword involves, it is preferable, using, in addition to the important information itself, a character string (e.g., an [address] and a [name]) which the important information is described anterior to and posterior to.

Moreover, in the present invention, the encryption area extracting means may extract a first area becoming an encryption target area and a second area different from the first area, the digital image generating means may generate a first digital image related to the first area extracted by the encryption area extracting means and a second digital image related to the extracted second area, and the encrypting means may encrypt the digital image related to the first area and the digital image related to the second area on the basis of encryption keys different from each other.

Namely, according to the present invention, the different encryption keys are used for encrypting the different areas, whereby it is possible to perform access control based on the encryption key and to encrypt the electronic data in a way that sets security levels.

Further, the present invention is an electronic document decrypting system comprising: encrypted image acquiring means acquiring an encrypted image contained in an electronic document; decrypting means decrypting the encrypted image acquired by the encrypted image acquiring means on the basis of a decryption key; and already-decrypted electronic document generating means generating an already-decrypted electronic document in which when an electronic document containing the encrypted image is output, in place of the encrypted image, the digital image decrypted by the decrypting means is output to an area to which the encrypted image is to be output.

Moreover, such a scheme may also be taken as to detect and specify the characters and the format in the decrypted digital image and to generate the already-decrypted electronic document containing the decrypted area in the digital image as the information based on the character codes, the format information, etc. With this scheme, the electronic document, which is the same as or approximate to the pre-encrypting electronic document, can be restored, and the convenience is improved.

Still further, the present invention can be grasped as a method executed by a computer or as a program for making the computer function as the respective means. Moreover, the present invention may also be a recording medium recorded with the program that can be read by the computer, other devices, machines, etc. Herein, the recording medium readable by the computer etc connotes a recording medium capable of storing information such as data, programs, etc electrically, magnetically, optically, mechanically or by chemical action, which can be read from the computer and so on.

The present invention makes it possible to provide the system capable of distributing the electronic document containing the important information with the browsing restriction being set and the information with none of the browsing restriction being set without removing the important information from the electronic document.

BRIEF DESCRIPTION OF THE DRAWINGS

FIG. 3 A diagram showing a display image of the electronic document containing a keyword.

DESCRIPTION OF EMBODIMENTS

An embodiment of the present invention will be described with reference to the drawings.

<Electronic Document Encrypting System and Decrypting System>

Figure 1:
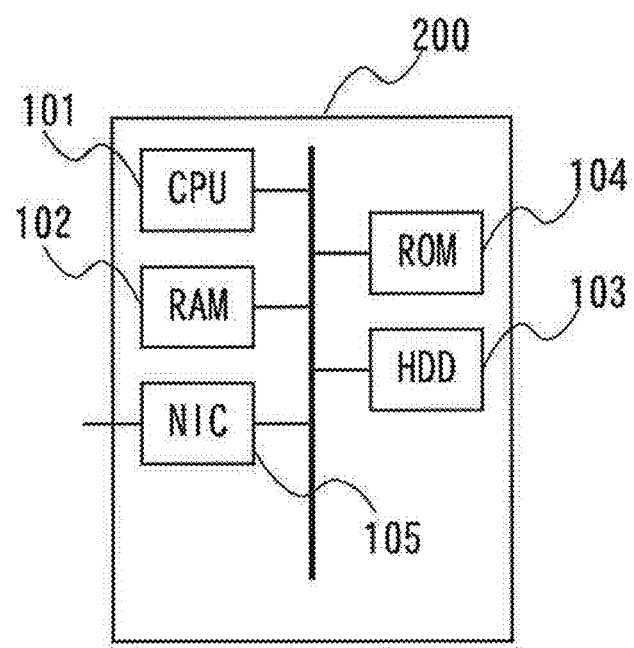
FIG. 1 A diagram showing an outline of a hardware architecture of an electronic document encrypting system according to an embodiment.

FIG. 1 is a diagram showing an outline of a hardware architecture of an electronic document encrypting system 200 according to the present embodiment. The electronic document encrypting system 200 is a computer including a CPU (Central Processing Unit) 101, a main storage device such as a RAM (Random Access Memory) 102, an auxiliary storage device such as an HDD (Hard Disk Drive) 103, a ROM (Read Only Memory) 104 and a network interface such as a NIC (Network Interface Card) 105 that is connected to a network such as the Internet or Intranet.

Figure 2:
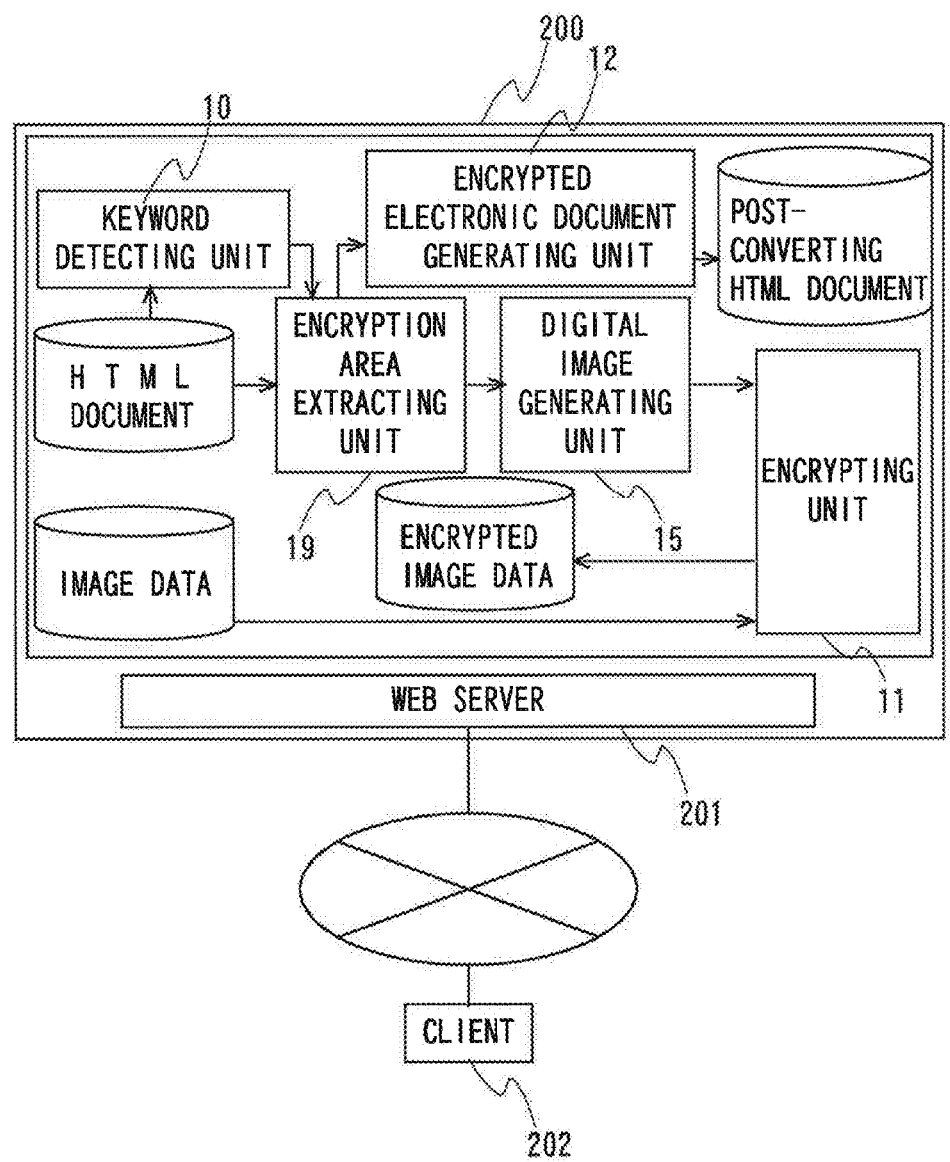
FIG. 2 A diagram illustrating an outline of a functional configuration of the electronic document encrypting system according to the embodiment.

FIG. 2 is a diagram illustrating an outline of a functional configuration of the electronic document encrypting system 200 according to the present embodiment. The electronic document encrypting system 200 prevents important information from being leaked out by encrypting a predetermined area in an electronic document such as an HTML (HyperText Markup Language) document distributed to a client 202 by a Web server 201 connected to the network such as the Internet.

The CPU 101 executes an electronic document encrypting program read from the HDD 103 and developed on the RAM 102, whereby the electronic document encrypting system 200 functions as a keyword detecting unit 10 that detects a predetermined keyword from the electronic document such as the HTML document, an encryption area extracting unit 19 that extracts an encryption target area from the electronic document, a digital image generating unit 15 that generates the digital image based on the area extracted by the encryption area extracting means in the electronic document, an encrypting unit 11 that generates an encrypted image by encrypting the generated digital image, and an encrypted electronic document generating unit 12 that generates an encrypted electronic document used for display, including the encrypted image.

The keyword detecting unit 10 detects a keyword contained in the electronic document by searching within the electronic document like the HTML document etc on the basis of the keyword defined as a predetermined character string. Herein, the "keyword" connotes the character string set for extracting, from the electronic document, existence or non-existence of the should-be-encrypted information and also extracting the position of the should-be-encrypted information when transformed into the digital image.

The encryption area extracting unit 19 extracts an area associated with the keyword detected by the keyword detecting unit 10, as the encryption target area. FIG. 3 is a diagram illustrating a display image of an electronic document 300 containing the keyword. For example, if a [name of client] is set as the keyword, it is determined whether or not the electronic document 300 contains the keyword, and, if contained, an area associated with a position 301 in which to describe the keyword when transformed into the digital image, is extracted as an encryption target area 302. Namely, in a table included in the electronic document 300, a column containing the keyword [name of client] is presumed to be a field (area) where the names of the clients are described, and hence an area 302 in which to describe the should-be-encrypted information can be automatically extracted. It is to be noted that the present embodiment has attained detection of a title of the column (field) in the table by use of the keyword and may also involve using a method of extracting the area presumed to be the name of the client each time by referring to a dictionary file etc. In the case of extracting, e.g., the name of the client, the extraction may be done by employing an enterprise name list and keywords such as an [Joint-Stock Corporation] and a [Limited Liability Company].

The digital image generating unit 15 generates the digital image in a pixel form on the basis of the electronic document. The digital image generating unit 15 converts the image appearing in the case of printing or displaying the extracted area of the electronic document into the digital image in a so-called bitmap format. According to an example in FIG. 3, the image appearing in the case of displaying or printing a text area 302 consisting of character codes and format information, is generated as the image in the bitmap format. Thus, the encryption target area is converted into the digital image, thereby enabling the encrypting unit 11 to encrypt the image.

The encrypting unit 11 converts the digital image etc generated by the digital image generating unit 15 into an encrypted image on the basis of an encryption key. An in-depth description of the encrypting process by the encrypting unit 11 will be made later on.

Figure 4:
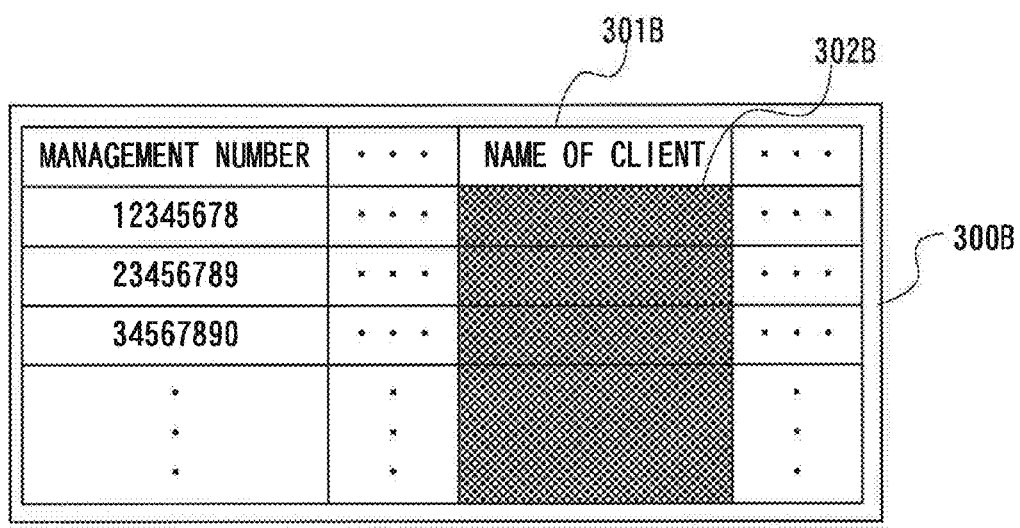
FIG. 4 A diagram showing a display image of an encrypted electronic document generated by an encrypted electronic document generating unit.

The encrypted electronic document generating unit 12 generates an encrypted electronic document. The encrypted electronic document is an electronic document in which an encrypted image encrypted by the encrypting unit is output to an area to which the encryption target information is to be output, if the electronic document is output in an as-is state without being encrypted, in place of the encryption target information. FIG. 4 is a diagram illustrating the image in the case of displaying or printing the encrypted electronic document generated by the encrypted electronic document generating unit 12. FIG. 4 illustrates the encrypted electronic document generated based on the electronic document in FIG. 3. The encrypted electronic document generating unit 12 deletes a code corresponding to a text area 302 from the original electronic document, and describes a link to an encrypted image 302B in place of the deleted code, thereby generating an encrypted electronic document 300B.

Figure 5:
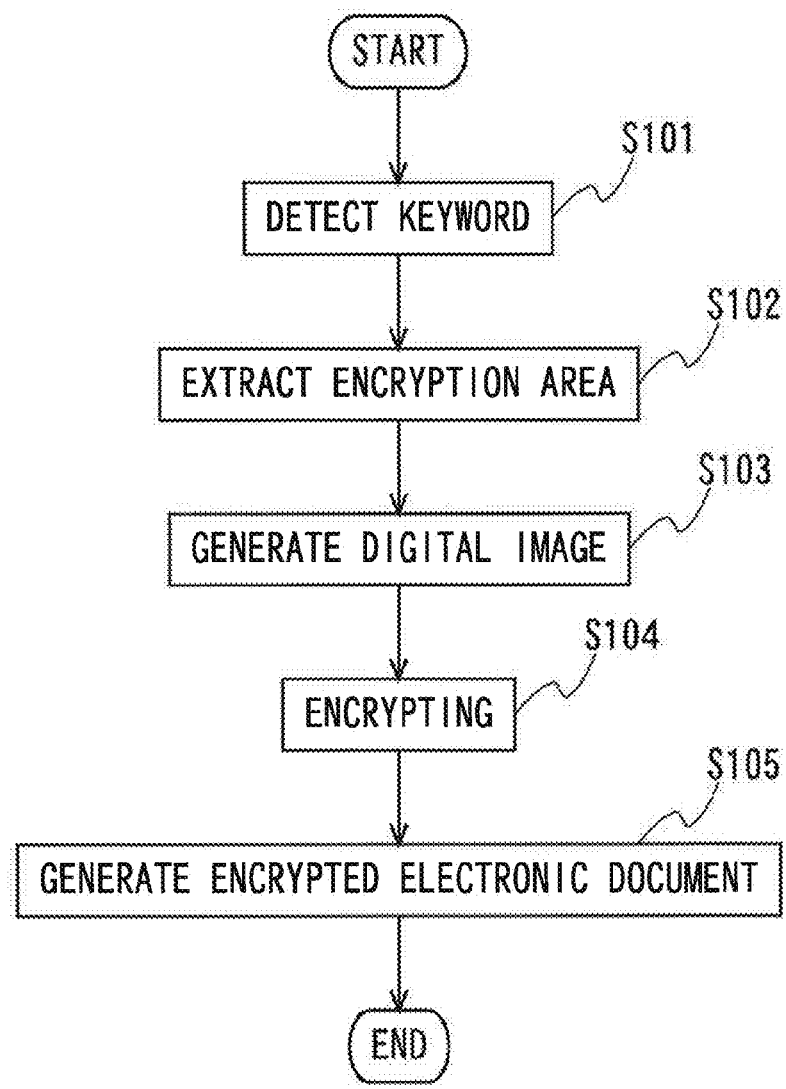
FIG. 5 A flowchart showing a flow of encrypting the electronic document in the embodiment.

FIG. 5 is a flowchart showing a flow of how the electronic document is encrypted in the present embodiment. A start of the process shown in the present flowchart is triggered by reading an electronic document encrypting program from the HDD 103 and developing the program on the RAM 102 and executing the program by the CPU 101 on the basis of user's operations.

In step S101, a keyword is detected. The keyword detecting unit 10 reads the electronic document such as the HTML document accumulated in the HDD, and searches within the electronic document by use of a predetermined character string as a keyword. As a result of the search, if the keyword is searched from within the electronic document, a position of the searched keyword is specified. Thereafter, the processing proceeds to step S102.

In step S102, the encryption area is extracted. The extracted area extracting unit 19 extracts, based on the position of the keyword detected in step S101, the encryption target area from the electronic document. The extracted area is a character string itself that is coincident with the keyword, a character string subsequent to the keyword, and so on. Thereafter, the processing proceeds to step S103.

In step S103, the digital image is generated. The digital image generating unit 15 generates the digital image by generating bitmap data of the printed or displayed image of the area extracted in step S102. Thereafter, the processing proceeds to step S104.

In step S104, the encryption is conducted. The encrypting unit 11 generates the encrypted image according to the digital image generated in step S103 and an encryption key. Details of the encrypting process will be explained later on. Thereafter, the processing proceeds to step S105.

In step S105, the encrypted electronic document is generated. The encrypted electronic document generating unit 12, if the electronic document is a document taking a format that does not contain the image data of the HTML document etc, deletes the code corresponding to the encryption target area from the original electronic document, and generates the encrypted electronic document by describing the link to the encrypted image in place of the deleted code. Note that if the electronic document is a document taking a format that contains the image data within the document itself, the encrypted electronic document with the contained image data being replaced, is generated. Thereafter, the process shown in the present flowchart is terminated.

Next, the electronic document decrypting system 500 according to the present embodiment will be described. The encrypted electronic documents generated by the electronic document encrypting system 200 are accumulated in the HDD and distributed to the client 202 via the Web server 201. Therefore, when the client 202 accesses the Web server 201 and gets a target Web page displayed, part of the page is displayed in an encrypted status. On this occasion, the encrypted image is displayed as one of elements organizing the page, and hence the user can grasp from browsing the displayed Web page that some of the elements organizing the page are encrypted. Herein, the user makes the client 202 execute the installed electronic document decrypting program, whereby the client 202 is made to function as the electronic document decrypting system that decrypts the encrypted electronic document. Note that the electronic document decrypting program, it is preferable, be implemented as add-on software of the Web Browser.

Figure 6:
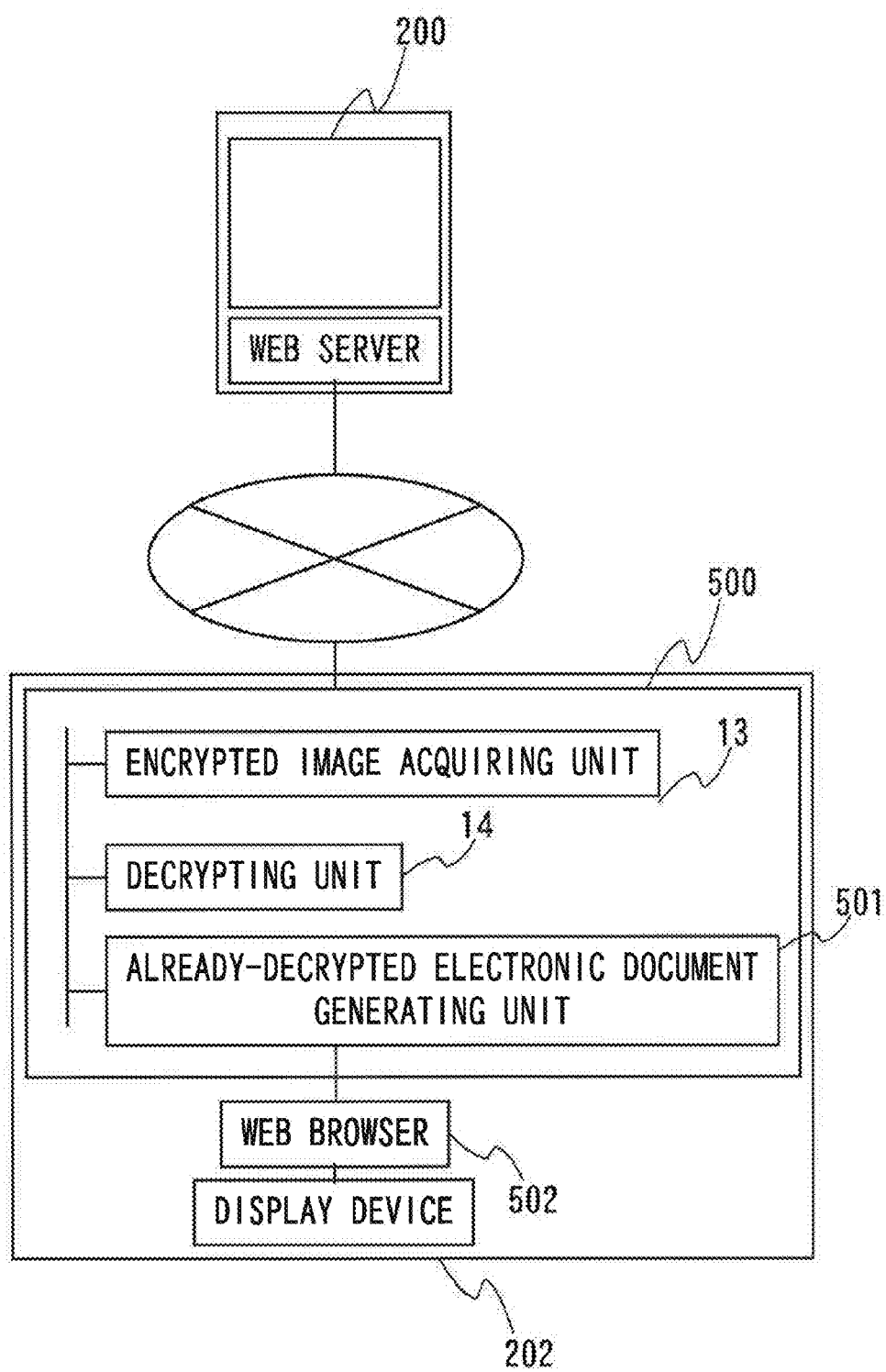
FIG. 6 A diagram illustrating an outline of a functional configuration of an electronic document decrypting system according to the embodiment.

FIG. 6 is a diagram showing an outline of a functional configuration of the electronic document decrypting system 500 according to the present embodiment. The CPU 101 executes the electronic document decrypting program read from the HDD 103 and developed on the RAM 102, whereby the electronic document decrypting system 500 functions as an encrypted image acquiring unit 13 that acquires the encrypted image contained in the electronic document, a decrypting unit 14 that generates the already-decrypted digital image by decrypting the acquired digital image, and an already-decrypted electronic document generating unit 501 that generates the already-decrypted electronic document on the basis of the decrypted digital image. It is to be noted that a hardware architecture of the electronic document decrypting system 500 is substantially the same as the architecture of the electronic document encrypting system 200, and therefore its explanation is omitted (see FIG. 1).

The encrypted image acquiring unit 13 acquires the encrypted image contained in the electronic document encrypted by the electronic document encrypting system 200. The encrypted image to be acquired may be selected by the user's operation and may also be automatically selected by detecting a regular pattern possessed by the encrypted image. The encrypted image according to the present embodiment has, as will be mentioned later on, the regular pattern generated by converting pixel values of the input image.

The decrypting unit 14 decrypts the encrypted image acquired by the encrypted image acquiring unit 13 with the decryption key. Details of the decrypting process by the decrypting unit 14 will be described later on.

The already-decrypted electronic document generating unit 501 generates the already-decrypted electronic document. The already-decrypted electronic document is an electronic document in which if the electronic document is output in an as-is state without being decrypted, in place of the encrypted image, the digital image decrypted by the decrypting unit 14 is output to an area to which the encrypted image is to be output. The already-decrypted electronic document generating unit 501 deletes the code (which is the link information in the case of the HTML document) corresponding to the encrypted image from the encrypted electronic document, and, in place of the deleted code, the link to the already-decrypted digital image is described, thereby generating the already-decrypted electronic document. Without changing the code, however, the image data itself may be replaced with the already-decrypted image from the encrypted image.

Further, the already-decrypted electronic document generating unit 501 detects and specifies the characters in the digital image decrypted by the decrypting unit 14 in a way that uses a so-called OCR (Optical Character Recognition) technology, and may thus generate the electronic document containing the characters in the digital image as character information based on character codes. The electronic document, which is the same as or similar to the electronic document used for the encryption, can be obtained by restoring the character codes and the format information from the decrypted digital image. Note that the electronic document to be generated, it is preferable, be the electronic document taking a handle-enabled format in the same application as the application by which the pre-encrypting electronic document is generated. Moreover, the electronic document generating unit 501 can more precisely generate the electronic document close to the pre-encrypting electronic document by detecting and specifying, in addition to the characters, a format, a graph/illustration contained in the digital image, and a layout thereof. The electronic document close to the pre-encrypting electronic document is restored, whereby the decrypted information can be dealt with as the electronic document, and the convenience of the user is improved.

Figure 7:
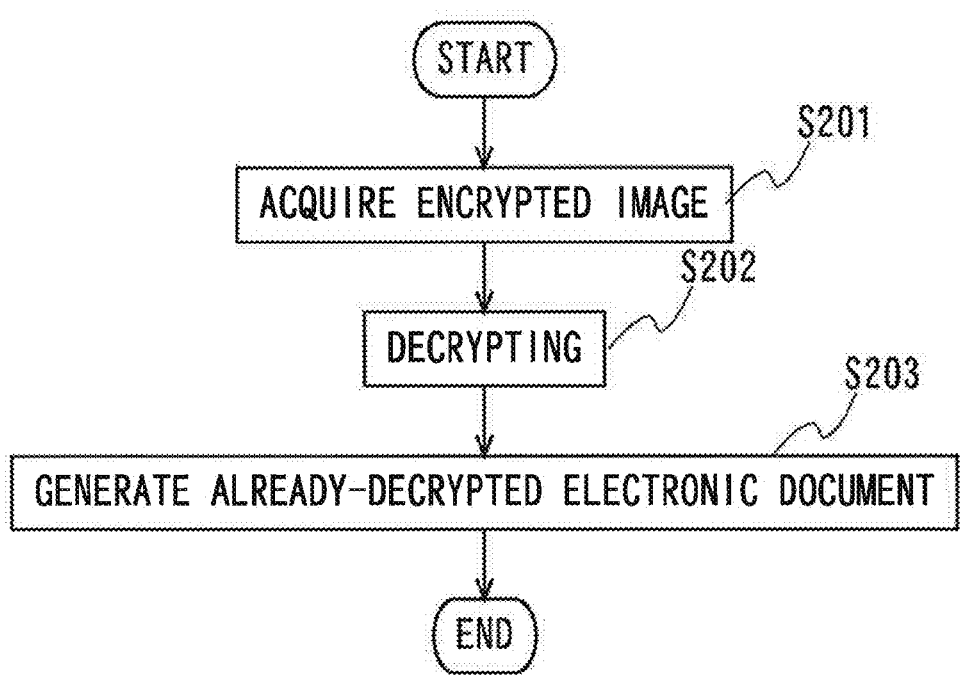
FIG. 7 A flowchart showing a flow of an electronic document decrypting process in the embodiment.

FIG. 7 is a flowchart showing a flow of the electronic document decrypting process in the present embodiment. A start of the process shown in the present flowchart is triggered by reading an electronic document decrypting program from the HDD 103 and developing the program on the RAM 102 and executing the program by the CPU 101 on the basis of user's operations. Since the decryption key is preset in the electronic document decrypting system, the user, who employs the client 202 functioning as the electronic document decrypting system 500, can be determined to have authority to browse the encryption area, in which case the process shown in the present flowchart may also be started without waiting for an input of a user's instruction.

In step S201, the encrypted image is acquired. The electronic document decrypting system 500 acquires the encrypted image contained in the HTML document displayed by a Web Browser 502 at the present. Thereafter, the processing proceeds to step S202.

In step S202, the decryption is performed. The decrypting unit 14 generates the decrypted digital image by decrypting the encrypted image. The decryption key used on this occasion may involve employing a preset decryption key, and the user may also input the decryption key via a decryption key input interface each time the decrypting process is executed. A detailed explanation of the decrypting process will be made later on. Thereafter, the processing proceeds to step S203.

In step S203, the already-decrypted electronic document is generated. The already-decrypted electronic document generating unit 501 generates the already-decrypted electronic document by replacing the area in which to display the encrypted image in the HTML document displayed by the web Browser 502 at the present with the digital image generated in step S202, and gets the already-decrypted electronic document displayed by the web Browser 502. Thereafter, the process shown in the present flowchart is finished.

According to the present embodiment, the electronic document containing the important information with a browsing restriction being set and the information with none of the browsing restriction being set is distributed without removing the important information from the electronic document, and only the user who knows the decryption key is enabled to browse the information described in the encryption area. Moreover, after the encrypted electronic document has been output to the paper medium, if copied by use of a copying machine etc, the encrypted image gets deteriorated, and the decryption is disabled if copied repeatedly. This scheme enables prevention of the important documents from being easily copied by the copying machine and of the important information from leaking out.

It is to be noted that the present embodiment has described the encrypting system 200 and the decrypting system 500 as the different systems, however, the present invention may be realized as an electronic document encrypting/decrypting system including both of the encrypting function and the decrypting function.

The present embodiment has described the case of specifying the encryption target area by use of the keyword, however, a method of specifying the encryption target area may involve adopting methods other than detecting the keyword. For example, in a system constructed of a database server and a client, such a method may be adopted that an encryption target item in items of a table in the database is preset in the system, and another method may also be adopted, wherein the encryption target area is specified as metadata of the electronic document.

Figure 8:
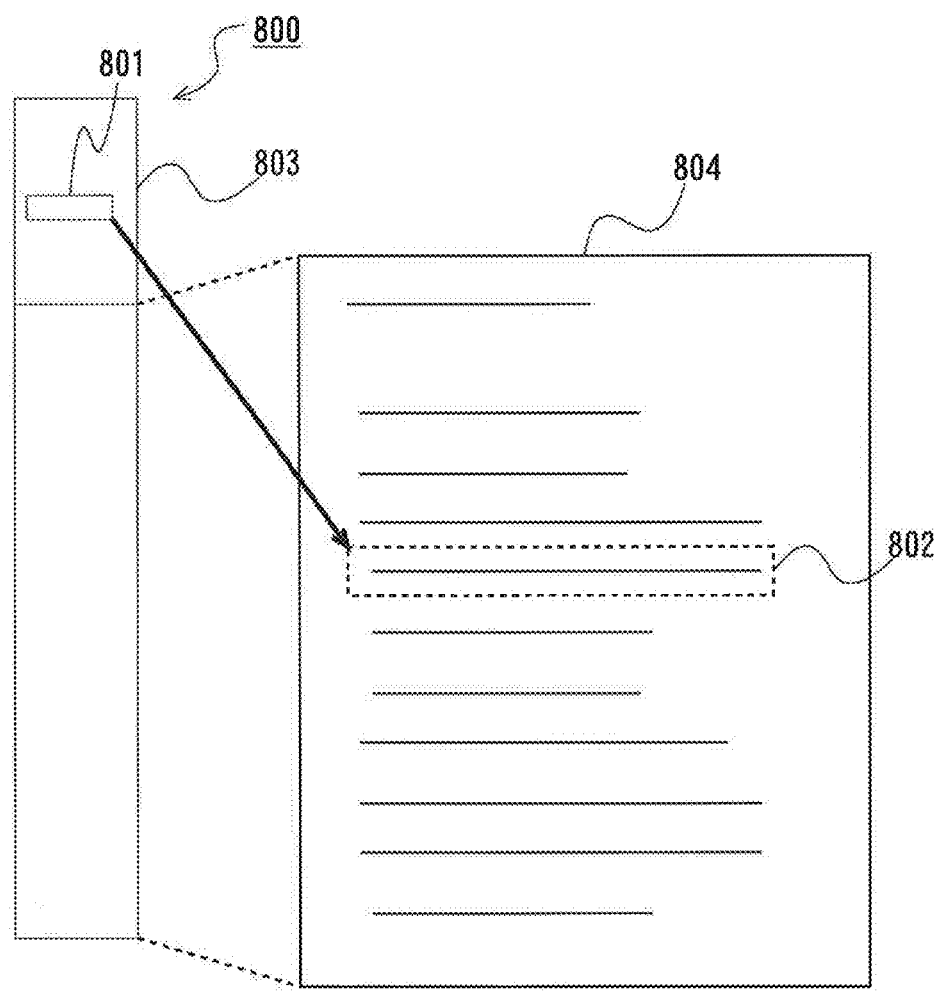
FIG. 8 A diagram illustrating an example of the electronic document in which metadata contains identifying information for specifying an encryption target area together with encryption target information.

FIG. 8 is a diagram showing an example of an electronic document 800 in which metadata 803 contains identifying information 801 for specifying the encryption target area together with the encryption target information. In the electronic document 800, the identifying information 801 specifies, as the encryption target area, an area 802 of a display image 804 displayed based on the electronic document 800.

Figure 9:
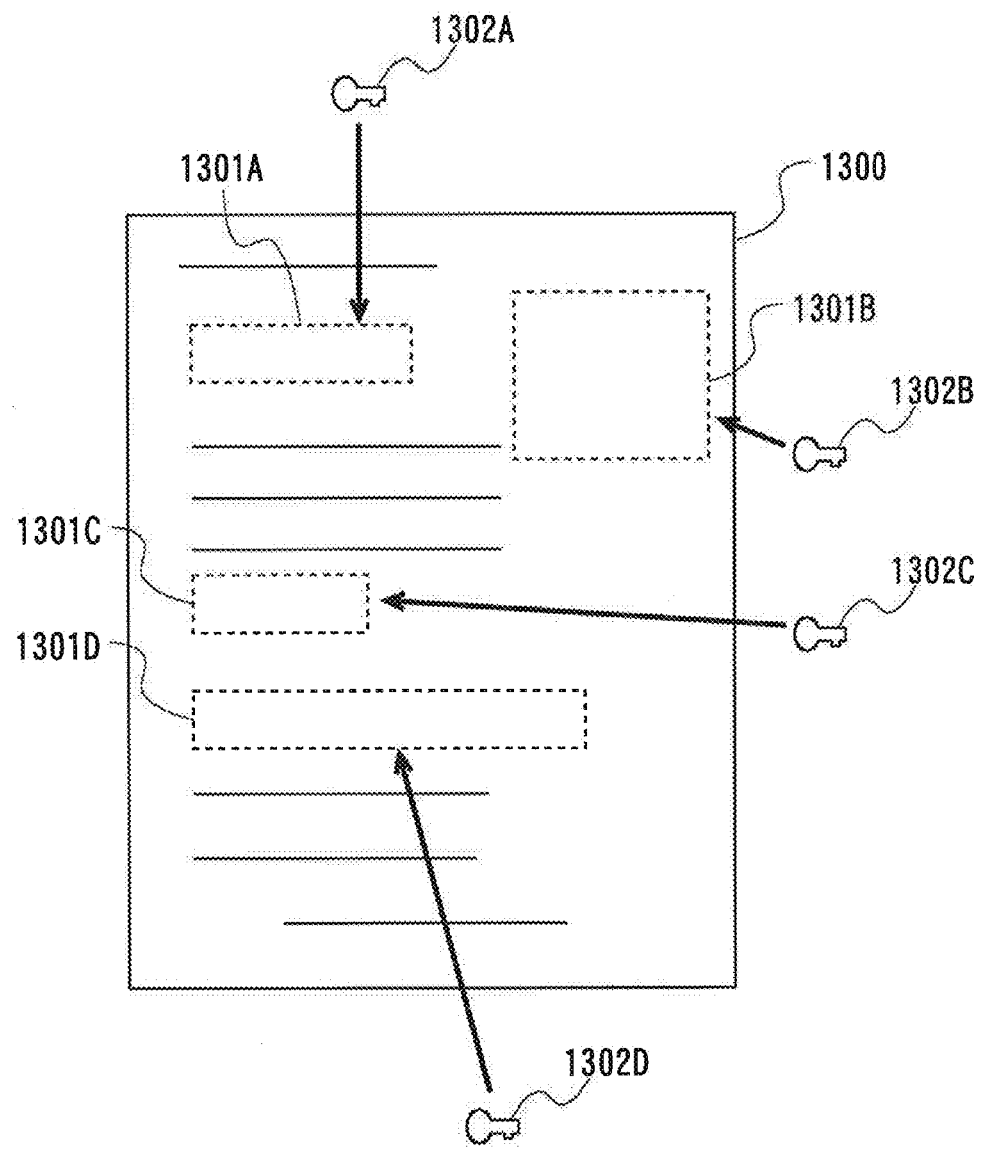
FIG. 9 A diagram showing a display image of the electronic document encrypted by use of a plurality of encryption keys.

Further, a plurality of areas, when one electronic document is digitally imagized, may be encrypted with encryption keys different from each other. FIG. 9 is a diagram illustrating a display image of an electronic document 1300 encrypted by use of the plurality of encryption keys. Supposing that there are areas 1301A, 1301B, 1301C and 1301D, these areas 1301A, 1301B, 1301C and 1301D are encrypted with corresponding encryption keys 1302A, 1302B, 1302C and 1302D, thereby enabling the browsing authority to be set for every area.

<Encrypting Unit and Decrypting Unit>

Next, outlines of the encrypting process by the encrypting unit and of the decrypting process by the decrypting unit in the first through third embodiments, will be explained.

Figure 10:
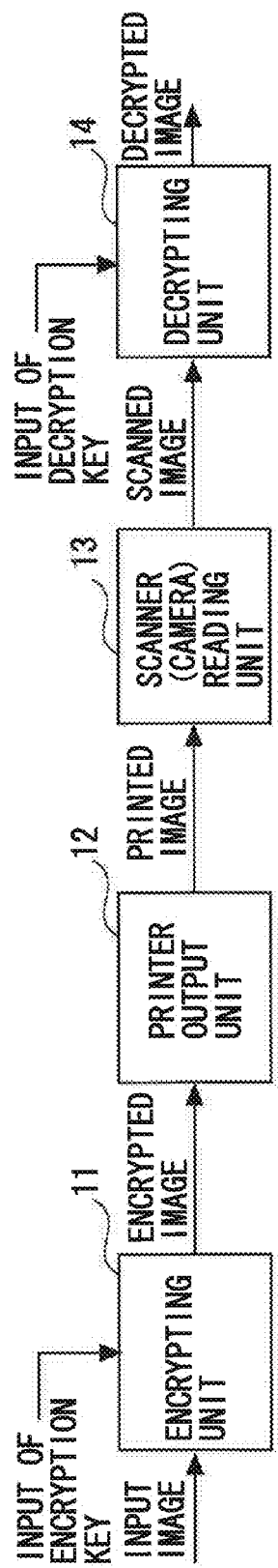
FIG. 10 A diagram showing a processing outline (part 1) of the encrypting process and the decrypting process.

FIG. 10 is a diagram showing a processing outline (part 1) of the encrypting process and the decrypting process. In FIG. 10, the encrypting unit (which is referred to as an encrypting unit 11A, encrypting unit 11B and an encrypting unit 11C in first through third modes, respectively) outputs the encrypted image into which part of the digital image has been encrypted on the basis of the inputted digital image and the encryption key specifying the encrypting method. The printer output unit 12 prints the digital image encrypted by the encrypting unit 11 on a printable physical medium such as the paper. The scanner (camera) reading unit 13 reads the printed image output by the printer output unit 12 by employing the scanner or the camera.

Then, the decrypting unit 14 (which is termed a decrypting unit 14A, a decrypting unit 14B and a decrypting unit 14C in the first through third modes, respectively) obtains the printed image output by the printer output unit 12 and the decrypted image with the inputted decryption key. As far as the inputted decryption key is valid, the encrypted image can be properly decrypted, and the information hidden with the encryption by the encrypting unit 11 gets visible.

Figure 11:
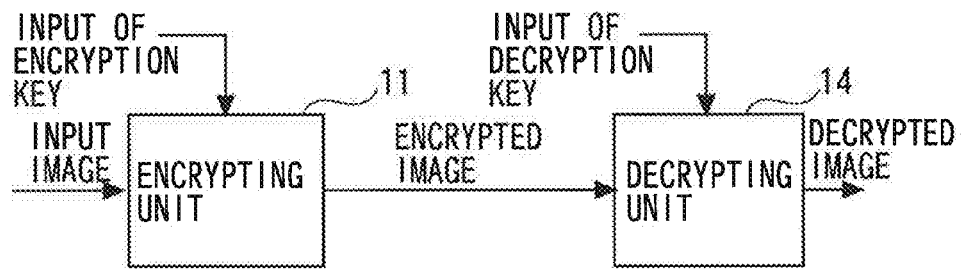
FIG. 11 A diagram showing a processing outline (part 2) of the encrypting process and the decrypting process.

FIG. 11 is a diagram showing a processing outline (part 2) of the encrypting process and the decrypting process. As shown in FIG. 11, the encrypting process and the decrypting process in the first through third modes to which the present invention is applied, enable the decrypted image to be acquired by inputting the digital image encrypted by the encrypting unit 11 in an as-is state of the electronic document image without via the printer and the scanner to the decrypting unit 14.

Next, the first through the third modes to which the present invention is applied will be described, respectively. To begin with, the first mode to which the present invention is applied will be described.

Figure 12:
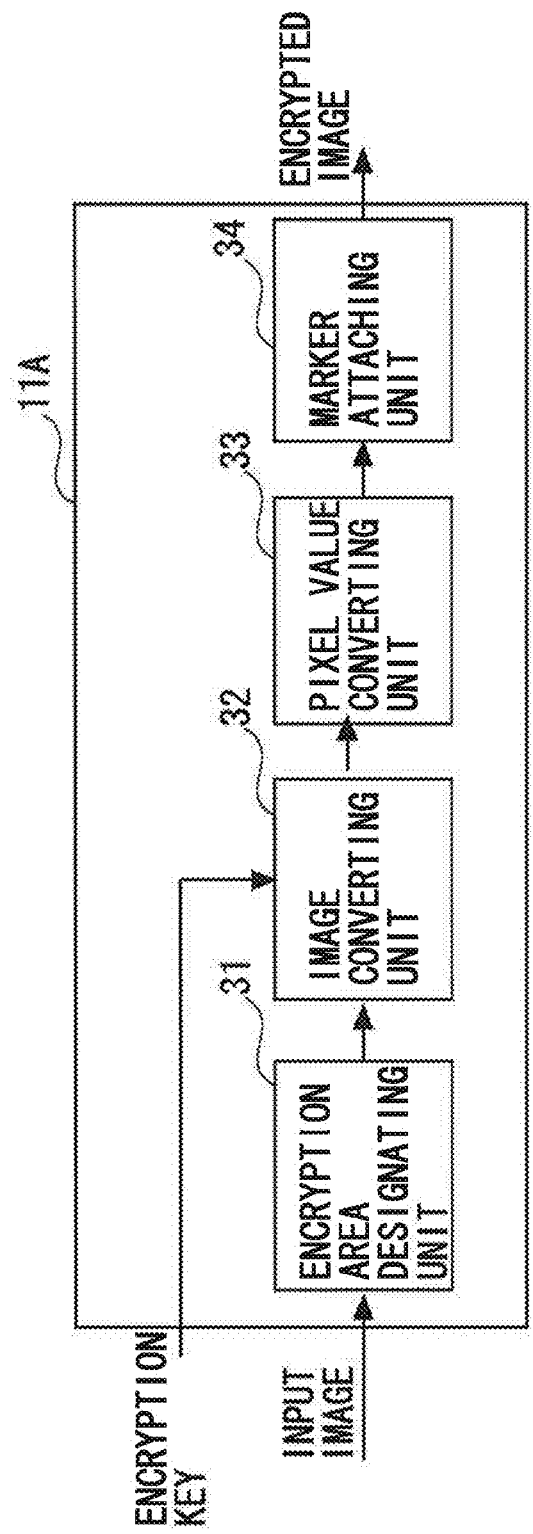
FIG. 12 A diagram showing an outline of the encrypting process in a first mode.

FIG. 12 is a diagram illustrating an outline of the encrypting process in the first mode. In FIG. 12, the encrypting unit 11A includes an encryption area determining (designating) unit 31, an image converting unit 32, a pixel value converting unit 33 and a marker adding unit 34.

The encryption area designating (determining) unit 31 selects an area to be encrypted from the inputted image containing the want-to-encrypt area.

Figure 13:
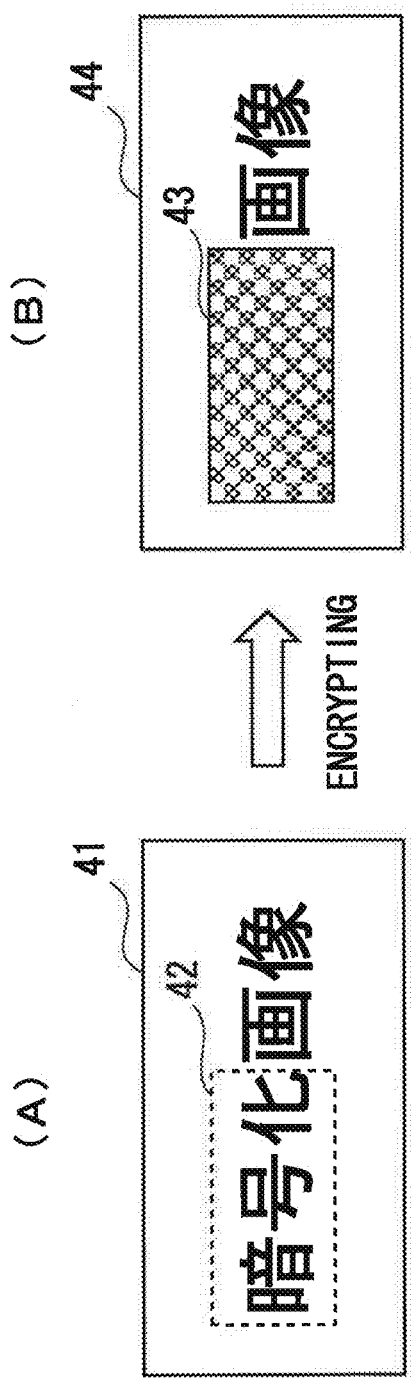
FIG. 13 A diagram showing an example of selecting an encryption area.

FIG. 13 is a diagram showing an example of selecting the encryption area. To be specific, the encryption area designating unit 31 selects, as illustrated in (A) of FIG. 13(A), an area 42 to be encrypted out of a digital image (inputted image) 41 containing the want-to-encrypt area. The area 42 is converted into a converted image 43 as illustrated in (B) of FIG. 13 by the processes of the image converting unit 32 and the pixel value converting unit 33 that will hereinafter be described, and the digital image 41 is converted into an encrypted image 44 containing the converted image 43.

The discussion gets back to the description in FIG. 12. When the encryption area designating unit 31 selects the area 42 to be encrypted, the image converting unit 32 inputs the to-be-encryption area 42 and the encryption key, and visually converts the an image of the to-be-encryption area 42 by a converting method associated with the encryption key. A conversion parameter on this occasion is generated based on binary data obtained from the inputted encryption key.

Figure 14:
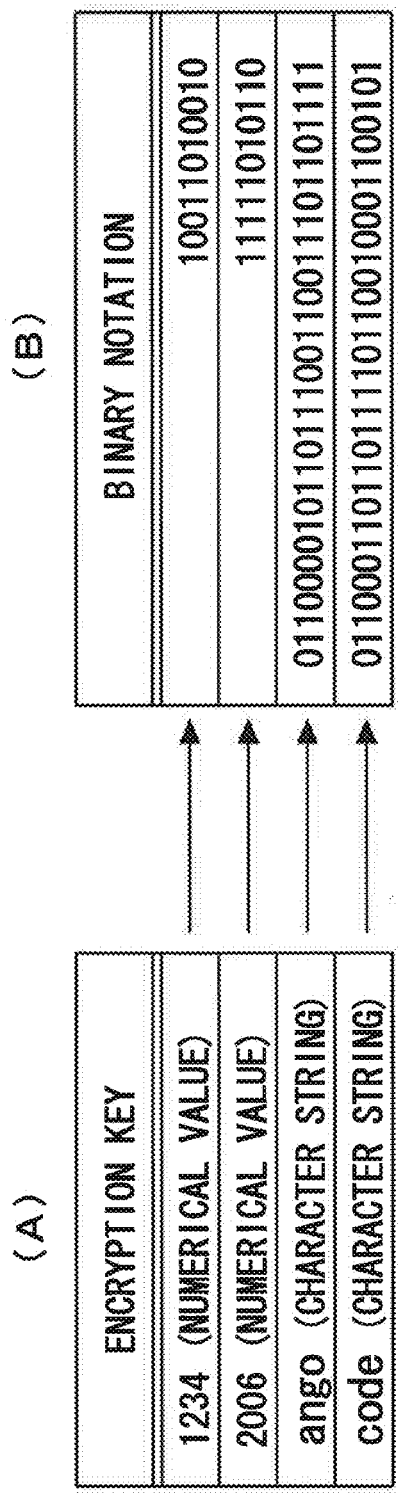
FIG. 14 A diagram showing an input example of the encryption key.

FIG. 14 is a diagram showing an example of inputting the encryption key. FIG. 14 shows an example of the encryption key and an example of the binary data generated from the encryption key. For example, a numeric value [1234] used as the encryption key is inputted in the form of binary data [100011010010], and a character string [ango] as the encryption key is inputted in the form of binary data [0110000101101110011001110101111].

The first mode exemplifies, as the image converting methods, two converting methods, i.e., one method based on a process (called a scramble process) of segmenting the image into micro areas and rearranging the micro areas and another method based on an image compression process.

To start with, the scramble process will be described. The scramble process is that at first the image of the selected area 42 is segmented into the micro areas each having a fixed size, and next the micro areas are rearranged based on the binary data obtained from the encryption key.

Figure 15:
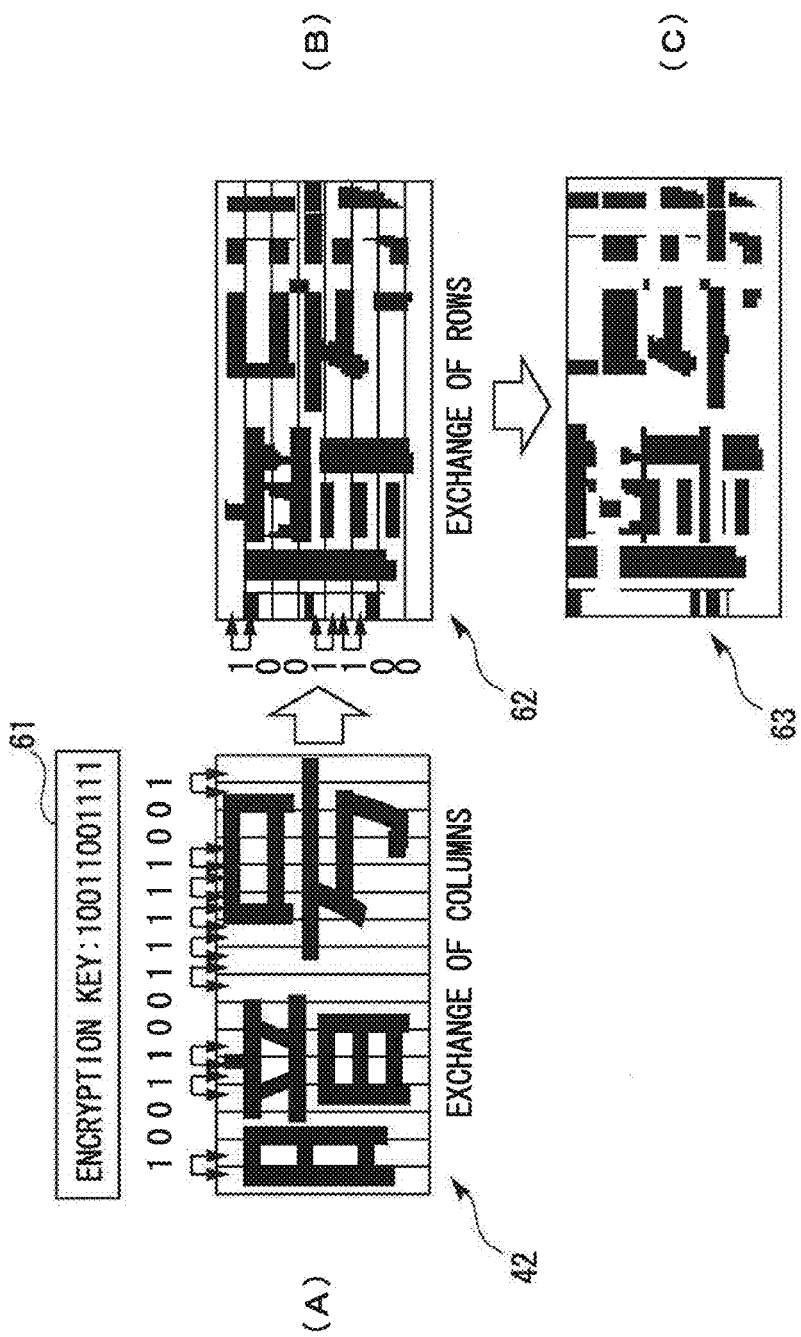
FIG. 15 A diagram showing one example of a scramble process in an image converting unit.

FIG. 15 is a diagram showing one example of the scramble process by the image converting unit. As shown in (A) of FIG. 15, at the first onset, the area 42 selected by the encryption area designating unit 31 is segmented in a vertical direction, respective bits of a binary string of the encryption key 61 are set corresponding to borders between the segmented areas (micro areas) 42 in sequence from the left, when the bit is [1], neighboring segmented columns (segmented areas) are exchanged with each other, and, when the bit is [0], an execute-nothing-process is conducted in sequence from the left side. If the bit count of the binary string is insufficient for a segmentation border count, the same binary string is repeated from a position where the insufficiency occurs, thus performing the exchanging process up to the right end of the area 42.

Subsequently, as shown in (B) of FIG. 15, an image area 62 undergoing the exchange process is segmented in a horizontal direction, the respective bits of the binary string of the encryption key 61 is set corresponding to the boarders between the segmented image areas 62 in sequence from above, and the same exchanging process as done for the vertical segmentation is executed sequentially from above on a row-by-row basis.

Then, as illustrated in (C) of FIG. 15, as a result of executing the exchanging process on the individual segmented images, a scramble image 63, defined as a processed image into which the original area 42 has been subjected to the scramble process, is acquired.

An extension method of this exemplified scramble process can involve executing the scramble process twice or more both in the horizontal direction and in the vertical direction, and can further involve changing the size of the segmented area in the exchange conducted from the second time onward. Moreover, different binary strings can be also employed for exchanging the segmented areas in the horizontal direction and in the vertical direction. These extension methods are, if a size of the inputted image is small while a bit length of the encryption key is large, effective especially as a means for preventing absolutely the same processed image from being generated based on the different encryption key.

Figure 16:
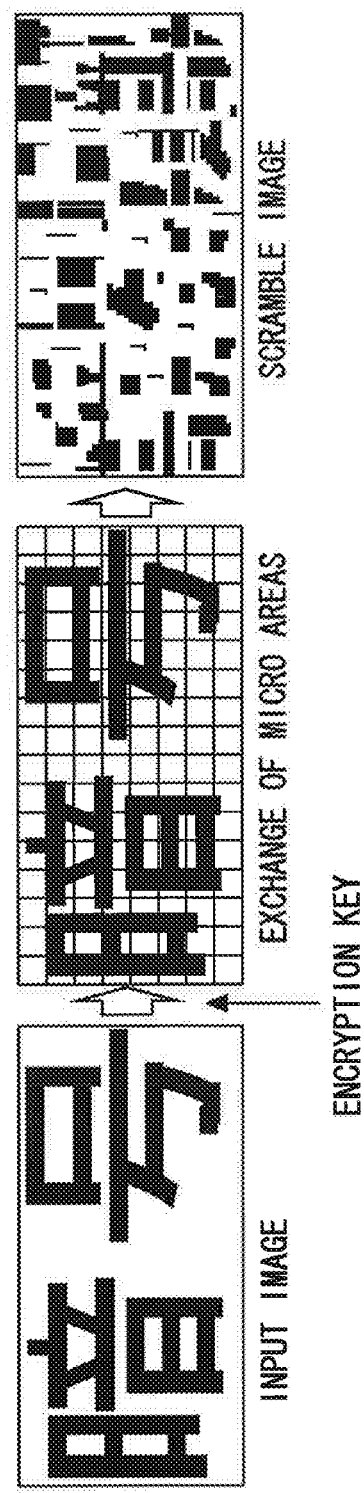
FIG. 16 A diagram showing another example of the scramble process in the image converting unit.

FIG. 16 is a diagram illustrating another example of the scramble process in the image converting unit. A method of exchanging the pixels on the unit of the micro area as illustrated in FIG. 16 can be used as another scramble processing method different from the scramble process explained with reference to FIG. 15. More specifically, the inputted image is segmented into the micro areas each taking a rectangular shape, and the segmented micro areas are exchanged with each other. This scheme has a greater scrambling count and enables strength of the encryption to a greater degree than by the method of conducting the exchanges in the horizontal direction (row) and in the vertical direction (column) described above.

Figure 17:
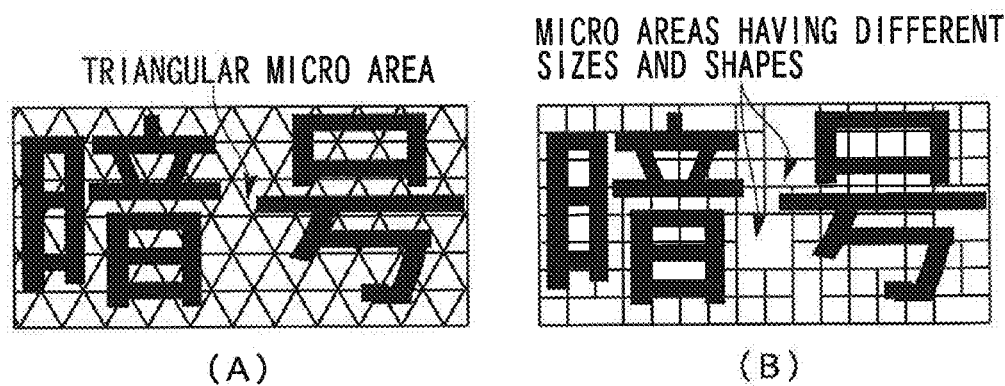
FIG. 17 A diagram showing a modified example of a shape of a micro area in the scramble process.

FIG. 17 is a diagram showing modified examples of the shape of the micro area in the scramble process. Further, the shape of the micro area when executing the scramble process can include, e.g., a triangle as illustrated in (A) of FIG. 17 in addition to the rectangle illustrated in FIG. 16. Moreover, as illustrated in (A) of FIG. 17, the micro areas having different shapes and different sizes can coexist as shown in (B) of FIG. 17.

Next, the converting method based on the image compressing process will be described.

Figure 18:
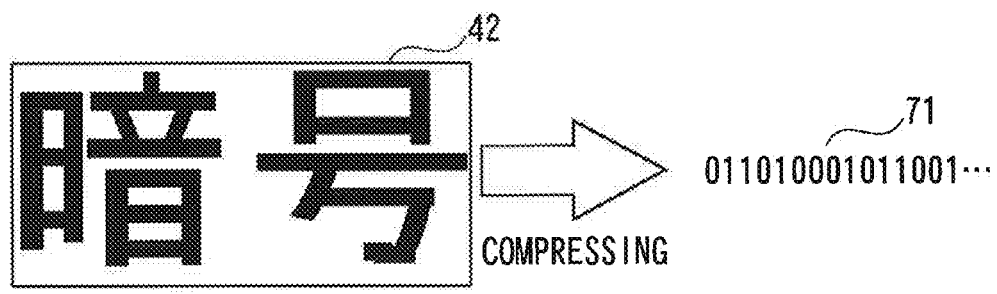
FIG. 18 A diagram showing a compressing process in the image converting unit.

FIG. 18 is a diagram showing a compression process in the image converting unit. When the input image 41 is a binary image, at first, as illustrated in (A) of FIG. 18, a binary string 71 as shown in (B) of FIG. 18 is generated by compressing an image of the area 42 selected by the encryption area designating unit 31. A compression method herein can involve applying all types of compression methods such as a run-length compression method used for transferring binary image data in a facsimile apparatus and a JBIG (Joint Bi-level Image experts Group) compression method defined as a standard compression method for the binary image.

Figure 19:
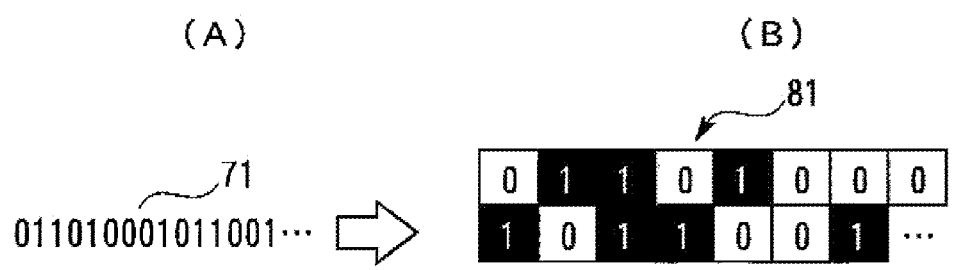
FIG. 19 A diagram showing a process of transforming converted image into an image.

FIG. 19 is a diagram showing a process of transforming the converted data into the images. As shown in FIG. 18, subsequent to the compression of the area 42, the respective bits of the binary string defined as the converted compression data are arrayed as black-and-white square images 81 in the area 42 of the image to be encrypted in a way that generates the square images (processed images) 81 by enlarging [0] bits as [white] squares and [1] bits as [black] squares in a designated size as illustrated in (B) of FIG. 19.

If desired to array the converted compression data (binary string 71) within the image of the selected area 42, the size of the square image 81 depends on a compression rate of the selected area 42. For example, if the compression rate is equal to or smaller than ¼, the size of the square image 81 is equivalent to (2×2) pixels at most, and, if equal to or smaller than 1/16, the size is equivalent to (4×4) pixels at most.

On the other hand, if desired to designate the size of the square image 81 and to arrange the compressed data within the image of the area 42, it is necessary for attaining a compression rate depending on the size of the square image 81 in the first image compression process. In the case of setting the square to, e.g., a (4×4) pixel size, the compression rate equal to or larger than 1/16 is needed. In this case, effective methods are a method of previously compressing the information in the selected area 42 and an irreversible compression method.

The encryption process of transforming the compressed data into the image in enlargement enables the enlarged black-and-white blocks to be recognized even when reading the encrypted image with, e.g., a low-resolution camera, and hence the encrypted image can be correctly decrypted.

The discussion gets back to the illustration in FIG. 12. A pixel value converting unit 33 converts at the fixed intervals the pixels within the processed image 63 converted by the image converting unit 32, thus making the converted image take substantially a grating-shaped stripped pattern.

Figure 20:
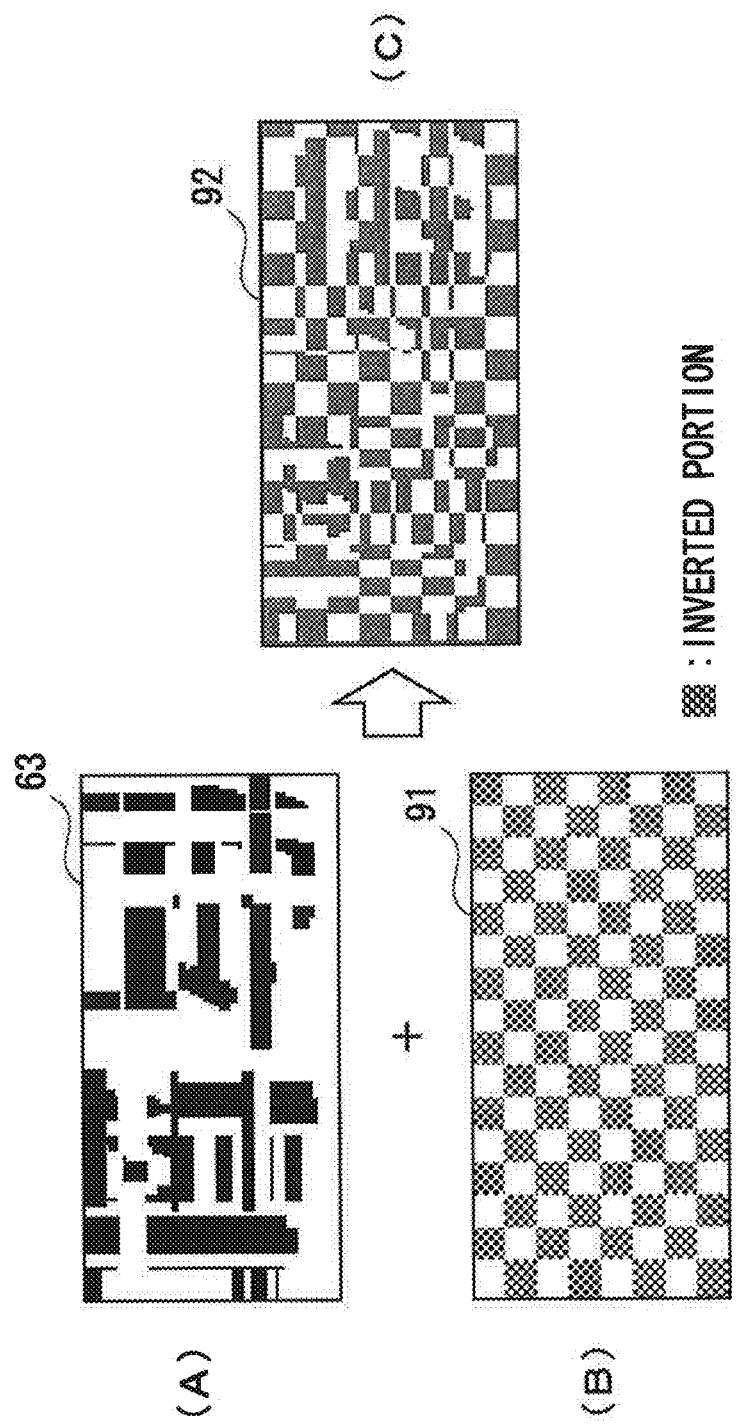
FIG. 20 A diagram showing an example (part 1) of a pixel value converting process in a pixel value converting unit.

FIG. 20 is a diagram showing an example (part 1) of a pixel value converting process. The pixel value converting unit 33 converts at the fixed intervals the pixels of the processed image 63 into which the area is scrambled by the image converting unit 32, whereby the encrypted image 44 takes substantially the grating-shaped stripped pattern as a whole. For example, as illustrated in FIG. 20, a converted image 92 in which the encrypted image 44 takes substantially the grating-shaped stripped pattern on the whole is acquired as shown in (C) by executing such conversion that the scramble image 63 shown in (A) of FIG. 20 is inverted (inversion process) with colored portions of a checkered pattern image 91 illustrated in FIG. (B). The stripped pattern to be generated is thereby used for detecting minute positions of the respective pixels within the encryption area when decrypting the encrypted image 44.

Another conversion can be carried out for a series of these processes. For example, the process of inverting the pixel values may also be a process of adding a designated value.

Further, a checkered pattern image 91 illustrated in (B) of FIG. 20 has substantially the same size as the scramble image 63 shown in (A) has, however, only the central area, excluding the peripheral area, of the scramble image 63 may also be subjected to the inverting process.

Figure 21:
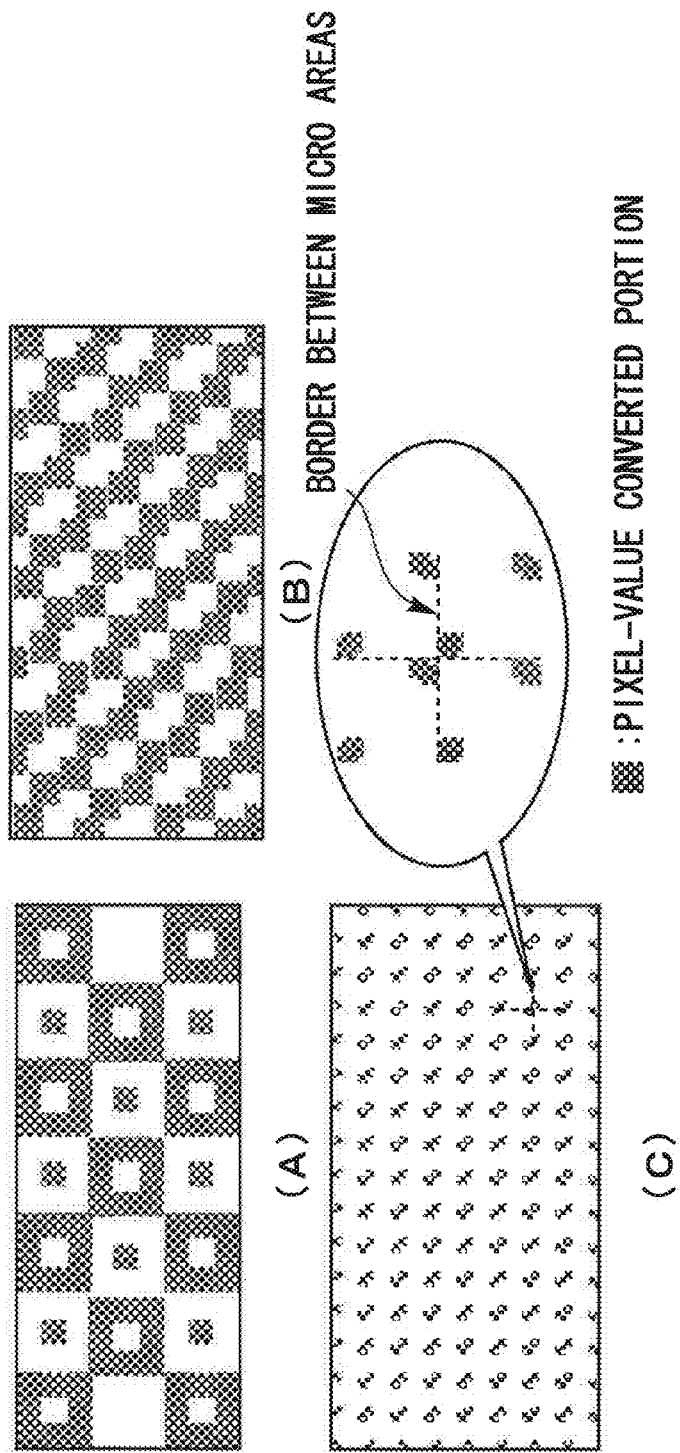
FIG. 21 A diagram showing an example (part 2) of the pixel value converting process in the pixel value converting unit.

FIG. 21 is a diagram showing an example (part 2) of the pixel value converting process by the pixel value converting unit. Moreover, a variety of shapes as illustrated in (A) through (C) of FIG. 21 can be applied to the area 42 in which to convert the pixel values. The conversion of the pixel values is a process aiming at detecting the border position between the micro areas with the high accuracy, and hence it is considered that, e.g., as in (A) of FIG. 21, only the border portions are pixel-value-converted. Further, as in (B) of FIG. 21, the borders between the conversion and the non-conversion appear at much minuter intervals by converting the pixel values while shifting little by little with respect to the micro areas, whereby the positions of the pixels of the encrypted image 44 can be detected in much greater detail in the decrypting process. Moreover, as in (C) of FIG. 21, only portions, in which the borders between the micro areas, are pixel-value-converted, thereby enabling deterioration of an image quality to be restrained to the minimum when reading and decrypting the images printed on a sheet of paper etc with the scanner and the camera.

Herein, such a postscript is added that if the shape of the micro area is not the square having a uniform size and if the micro areas are triangular ((A) of FIG. 17) of if the micro areas having different sizes and different shapes coexist (B) of FIG. 17), the pixel values are required to be converted by methods corresponding to the shapes without being limited to the conversion examples given above.

As described above, the present invention takes not the scheme that the regular patterns representing the encrypted positions are generated in the way of being overwritten on the inputted image as in Patent document 1 but the scheme that the regular patterns are generated by converting the pixel values of the inputted image. Accordingly, it does not happen that the image information of the edge portions of the encrypted image are sacrificed as by the prior arts, and the encryption can be done at the high efficiency in the form of making the position detecting information coexist with the original image information.

Note that if the pattern forming portions contain some pieces of image information, the regularity thereof is lost more or less, however, as will be mentioned about he process of the decrypting unit 14 that will be described later on, the encrypted positions can be detected by making use of statistical characteristics of the whole encrypted image.

The discussion gets back to the illustration in FIG. 12. The marker adding unit 34 adds positioning markers to, e.g., three corners other than the right lower corner among the four corners of the converted image 92 undergoing the converting process by the pixel value converting unit 33, thereby generating the encrypted image 44.

The marker adding unit 34 allocates the positioning markers for specifying the position of the encryption area 42 to the three corners excluding the right lower corner among the four corners of the converted image 92.

Figure 22:
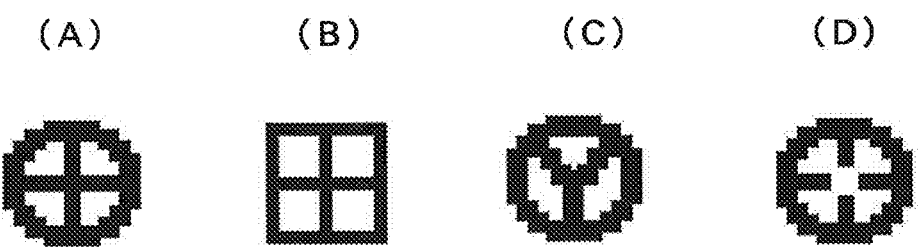
FIG. 22 A diagram showing an example of a positioning marker used for the encrypting process.

FIG. 22 is a diagram illustrating examples of the positioning markers used for the encryption process. The positioning marker used in the first mode takes, it should be assumed, a circled cross as illustrated in (A) of FIG. 22. The shape of the positioning marker may be in a broader sense formed by the circle or a polygon of a solid line and a plurality of lines intersecting the periphery thereof. This is exemplified such as a shape of [intra-square cross] which resembles kanji character [田] used as the positioning marker in (B) of FIG. 22, a circled Y consisting of three lines extending radially toward the periphery from the center as in the case of the positioning marker in (C), and a circled centrally-voided cross (lines disconnected at the center) as in the case of the positioning marker in (D).

Moreover, a color combination of the positioning marker may be such that most simply the background is white, while the foreground is black, however, it does not cause any inconvenience to properly change the color combination corresponding to a color (pixel values) distribution of the converted image 92 without being limited to the color combination given above. Further, a thinkable method is not that the determined colors are designated for the background and the foreground but that the positioning marker is formed by inverting the pixels values of the foreground while the background color is set to an as-is color of the digital image 41. With this contrivance, the image is encrypted while retaining the input image information of the positioning marker.

Figure 23:
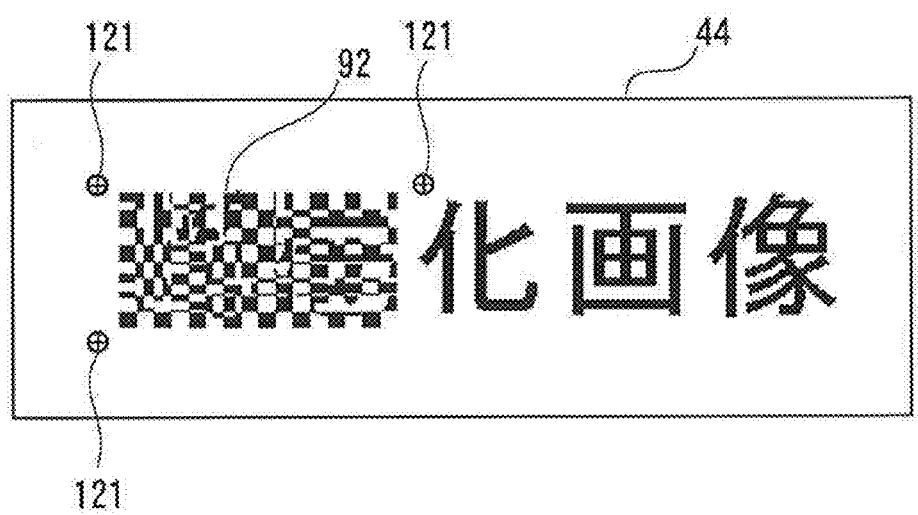
FIG. 23 A diagram showing an example of the encrypted image.

FIG. 23 is a diagram illustrating an example of the encrypted image. By the processes of the encrypting unit 11A, finally the encrypted image as illustrated in FIG. 23 is generated. The encrypted image 44 contains the converted image 92 and a positioning marker 121.

Moreover, in the encrypting method according to the first mode, when the image converting unit 32 adopts the [micro area rearranging process (scramble process)], the encryption process can be applied to a gray-scale image and a color image as well as to the binary image.

Figure 24:
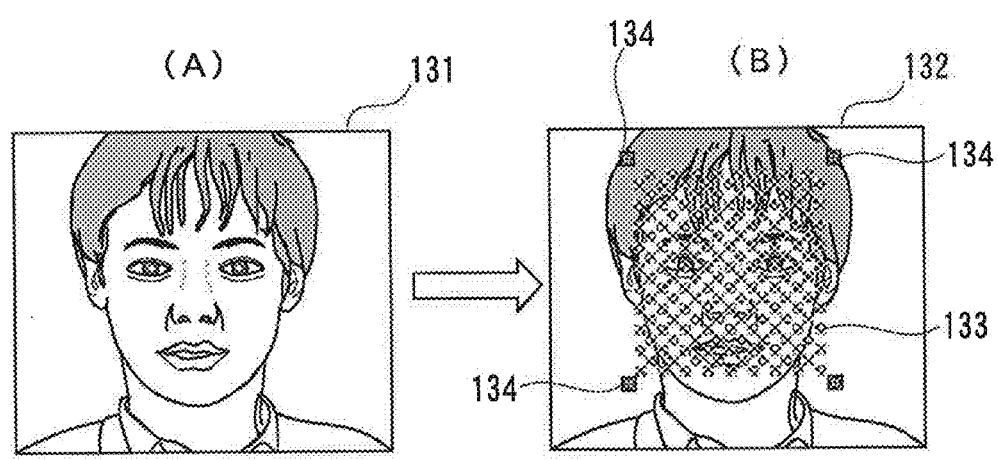
FIG. 24 A diagram of an example of encrypting a grayscale image.

FIG. 24 shows an example of how the gray-scale image is encrypted. In FIG. 24, a gray-scale image 131 illustrated in (A) is subjected to the process by the encrypting unit 11A, thereby generating an encrypted image 132 containing a converted image 133 and a positioning marker 134 as illustrated in (B).

Next, the decrypting unit 14A will be described.

Figure 25:
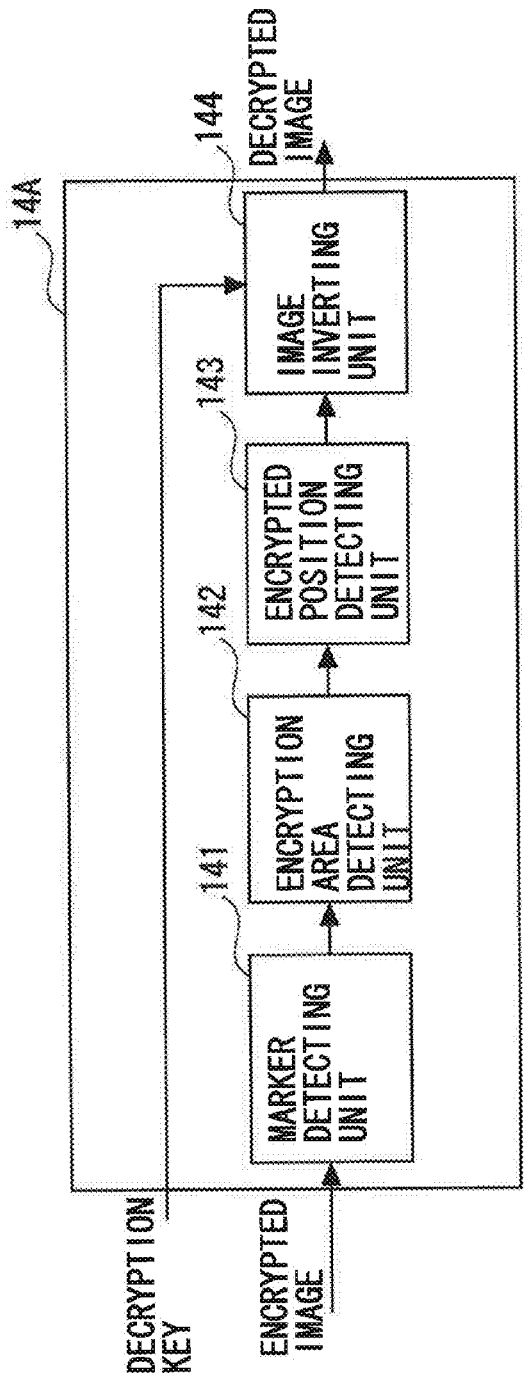
FIG. 25 A diagram showing an outline of a decrypting process in the first mode.

FIG. 25 is a diagram showing an outline of the decrypting process in the first mode. In FIG. 25, the decrypting unit 14A includes a marker detecting unit 141, an encryption area detecting unit 142, an encrypted position detecting unit 143 and an image inverting unit 144.

The marker detecting unit 141 detects, from the encrypted image, a position of the positioning marker added by the marker adding unit 34 in a way that uses a general image recognition technology. An applicable method as the detecting method involves using pattern matching and analyzing connectivity of graphics.

The encryption area detecting unit 142 detects the encrypted image area on the basis of the positional relation between the three positioning markers detected by the marker detecting unit 141.

Figure 26:
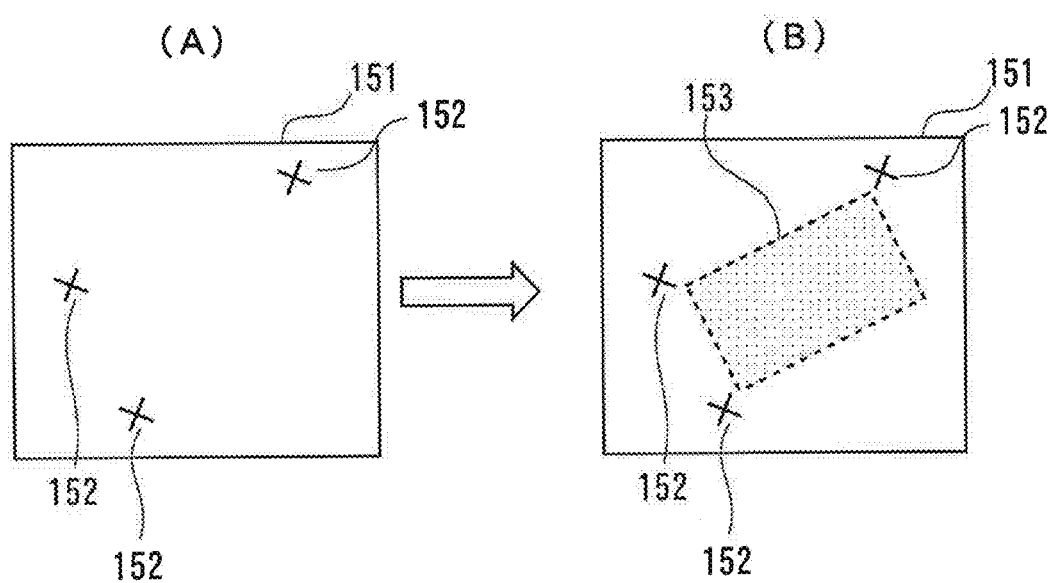
FIG. 26 A diagram showing a process of detecting the encryption area from the positioning marker.

FIG. 26 is a diagram showing a process of detecting the encryption area from the positioning marker. As shown in (A) of FIG. 26, when the marker detecting unit 141 detects at least three positioning markers 152 from the encrypted image 151, as illustrated in (B), one encryption area 153 can be detected. Namely, the three positioning markers 152 are disposed at the four corners of the rectangular encryption area 153, and hence a graphic form obtained by connecting these three points (the positions of the positioning markers 152) with lines becomes roughly a right-angled triangle. Then, if the three or more positioning markers 152 are detected, the positional relation between the three positioning markers 152 embraces an area taking a shape that is approximate to the right-angled triangle, and the encryption area 153 takes a rectangular shape in which the three positioning markers 152 correspond to three angular points among the four angular points. Note that if the number of the detected positioning markers 152 is equal to or smaller than "2", the corresponding encryption area 153 can not be specified, and hence the decrypting process is terminated on the assumption that the encrypted image does not exist.

Figure 27:
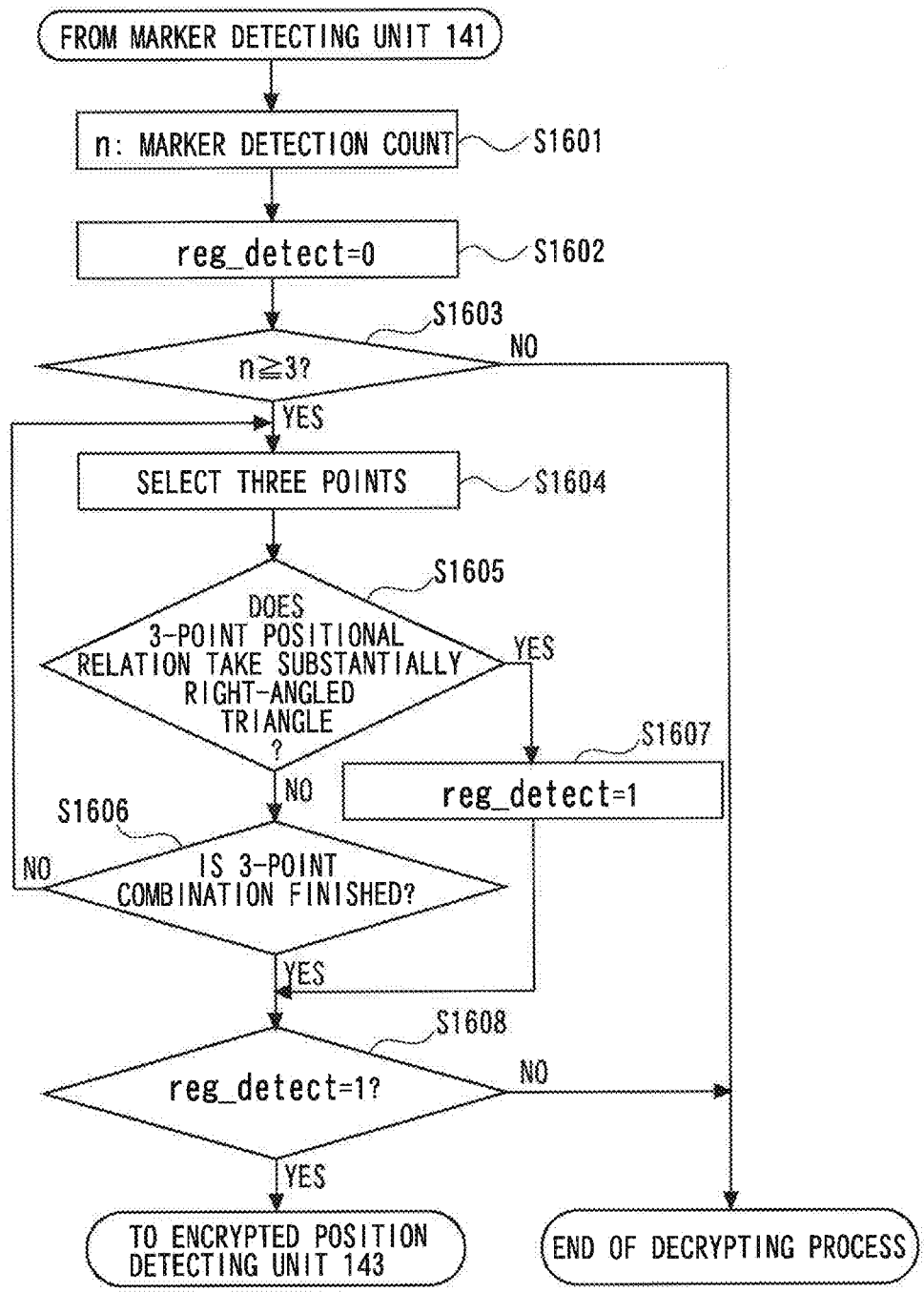
FIG. 27 A flowchart showing a flow of an encryption area detecting process.

FIG. 27 is a flowchart showing a flow of the encryption area detecting process. The encryption area detecting process executed by the encryption area detecting unit 142 starts with step S1601 in which the number of the positioning markers 152 detected by the marker detecting unit 141 is substituted into a variable n, and in step S1602, "0" is substituted into a detection flag "reg_detect" of the encryption area 153.

Then, in step S1603, it is determined whether or not the variable n, into which the number of the positioning markers 152 is substituted, is equal to or larger than "3", and, if the variable n is not equal to or larger than "3", i.e., if the variable n is not equal to or smaller than "2" (step S1603: No), the decrypting process including the present encryption area detecting process is terminated.

While on the other hand, if the variable n is equal to or larger than "3" (step S1603: Yes), in step S1604, the three positioning markers 152 among the positioning markers 152 detected by the marker detecting unit 141 are selected, and, in step S1605, it is determined whether or not the positional relation between the thus-selected three positioning markers 152 takes substantially the right-angled triangle.

If the positional relation between the selected three positioning markers 152 does not take substantially the right-angled triangle (step S1605: No), in step S1606, it is determined whether or not a 3-point combination of the positioning markers 152 detected by the marker detecting unit 141 is completely finished, then, if not finished (step S1606: No), returning to step S1604, another set of three points is selected, and, when finished (step S1606: Yes), the operation proceeds to step S1608.

Whereas if the positional relation between the selected three positioning markers 152 takes substantially the right-angled triangle (step S1605: Yes), in step S1607, "1" is substituted into the detection flag "reg_detect".

Then, in step S1608, it is determined whether or not "1" is substituted into the detection flag "reg_detect", i.e., it is determined whether or not the three positioning markers 152 of which the 3-point positional relation takes the right-angled triangle can be detected, and the operation proceeds to a process by the encrypted position detecting unit 143 if "1" is substituted into the flag "reg_detect" (step S1608: Yes) and to the decrypting process including the present encryption area detecting process is finished whereas if "1" is not substituted into the flag "reg_detect" (step S1608: No).

The discussion gets back to the illustration in FIG. 25. The encrypted position detecting unit 143 detects minute positions of the respective pixels within the encryption area 153 by the frequency analysis and pattern matching in a way that makes use of a point that the edge portions of the encryption area 153 detected by the encryption area detecting unit 142 have a regular pixel distribution in order to accurately decrypt the encrypted image 151. This detection involves utilizing such a characteristic that the whole of the encrypted image 151 has the periodic pattern owing to the pixel value converting (inverting) process of the pixel value converting unit 33.

One thinkable detection method is a method of obtaining a pattern cycle (width) in horizontal and vertical directions of the image by use of a frequency analyzing method such as Fast Fourier Transform (FFT) and thereafter detecting the border positions (offset) by template matching etc.

Further, the border positions can be detected by Hough transform in a way that utilizes such a characteristic that the border portion becomes rectilinear when applying an edge detection filter (Laplacian filter etc) to the encrypted image.

Figure 28:
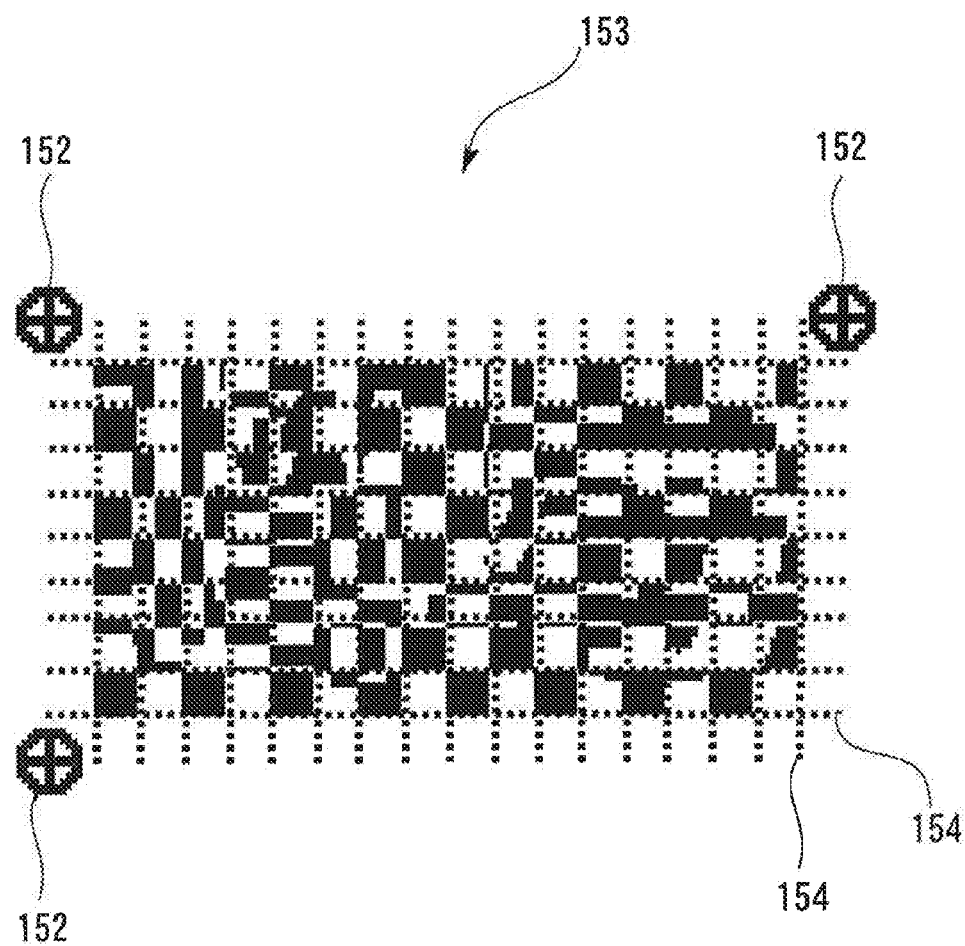
FIG. 28 A diagram showing an example in which an encrypted position is detected.

FIG. 28 is a diagram showing an example of how the encrypted positions are detected. If the encrypted digital image 41 is complicated, a possibility is that a portion with a remarkably declined cyclicality of the encrypted image 44 might appear. In this case, an effective method is a method of detecting the encrypted positions in a way that limits the image area used for calculating the pattern cycle and the border positions to the portions exhibiting comparatively strong cyclicality.

The discussion gets back to the illustration in FIG. 25. The image inverting unit 144 executes, about the encrypted image 44, the inverting process of the converting process of the image inverting unit 32 on the basis of a method corresponding to a decryption key by use of the encrypted position information detected by the encrypted position detecting unit 143 and the decryption key inputted by a user, thereby generating a decrypted image. A procedure of the decrypting process is realized by the procedure reversed to the encrypting process, and hence its description is omitted. What has been discussed so far is the description of the first mode to which the present invention is applied.

Next, a second mode to which the present invention is applied will be described.

Figure 29:
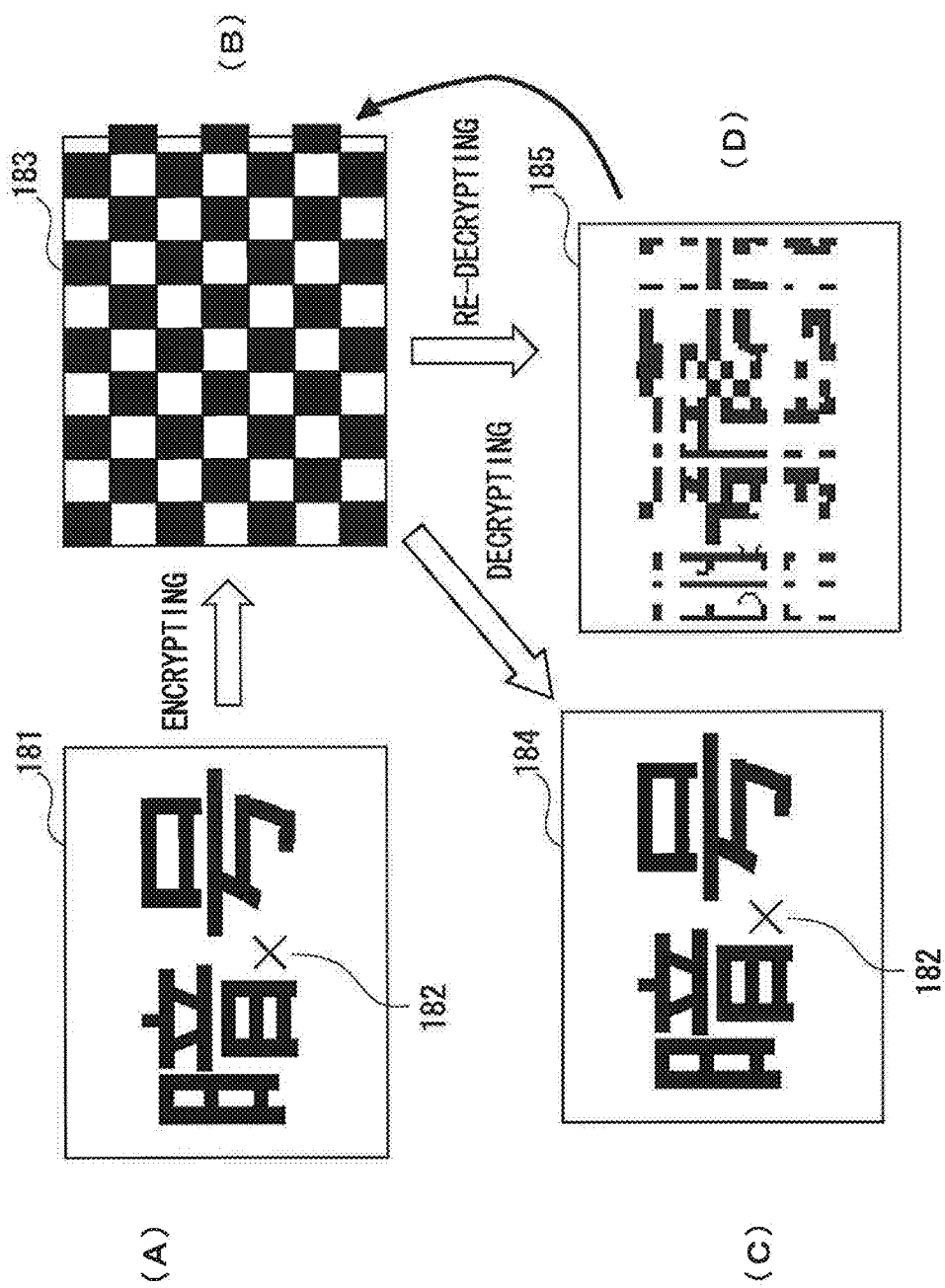
FIG. 29 A diagram illustrating a whole image in a second mode.

FIG. 29 is a diagram showing a whole image according to the second mode. The second mode is that before the encrypting process, a specified check mark 182 for verifying validity of decrypting the encrypted image 183 ((A) in FIG. 29) is attached to an arbitrary position of an area 181 to be encrypted, then the encryption is conducted ((B) in FIG. 29), the decryption is considered to be performed correctly if the check mark 182 attached beforehand is detected from the decrypted image 184 after decrypting the encrypted image 183, and the decrypting process is terminated ((C) in FIG. 29). Whereas if the check mark 182 is not detected ((D) in FIG. 29), the encrypted position is corrected, and the decrypting process is repeated till the check mark 182 is detected or till a designated standard is satisfied.

Figure 30:
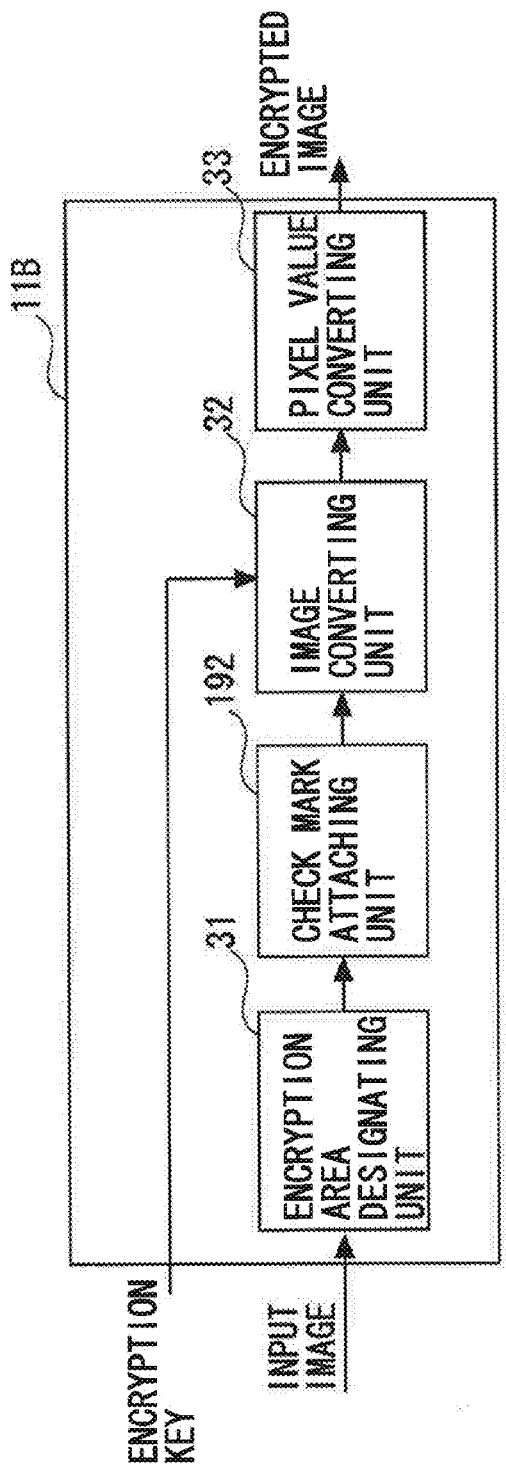
FIG. 30 A diagram showing an outline of the encrypting process in the second mode.

FIG. 30 is a diagram illustrating an outline of the encrypting process in the second mode. In FIG. 30, the encrypting unit 11B includes the encryption area determining unit 31, a check mark attaching unit 192, the image converting unit 32 and the pixel value converting unit 33.

In the same way as in the first mode, the encryption area designating unit 31 selects the to-be-encryption area from the input image containing a want-to-encrypt area.

Then, the check mark attaching unit 192 attaches the specified check mark 182 for verifying the validity of decrypting the encrypted image 183 to the arbitrary position of the area 181 to be encrypted. The check mark 182 is, it is desirable, attached to an area having, if possible, fewer image information and a flat pixel distribution.

After attaching the check mark 182 to the designated position, in the same way as in the first mode, the image converting unit 32 inputs the area 181 to be encrypted and the encryption key, an image of the area 181 to be encrypted is visually converted by the converting method corresponding to the encryption key, and the pixel value converting unit converts at the fixed intervals the pixels within the processed image converted by the image converting unit 32, thus making the converted image take substantially the grating-shaped stripped pattern.

Figure 31:
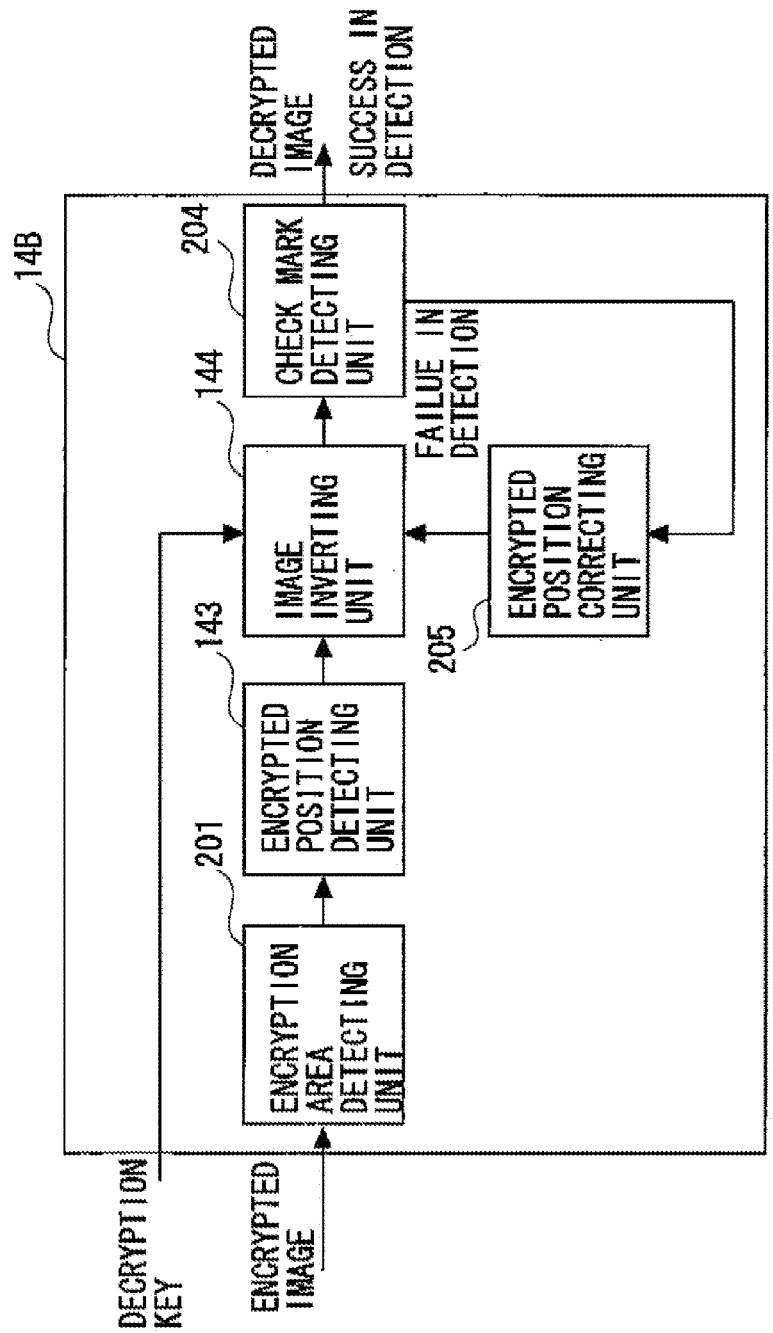
FIG. 31 A diagram showing an outline of the decrypting process in the second mode.

FIG. 31 is a diagram showing an outline of the decrypting process in the second mode. In FIG. 31, the decrypting unit 14B includes an encryption area detecting unit 201, an encrypted position detecting unit 143, an image inverting unit 144, a check mark detecting unit 204 and an encrypted position correcting unit 205.

To start with, the encryption area detecting unit 201 detects a rough area of the encrypted image 183. Through the encrypting process by the encrypting unit 11B, a pixel distribution of the encrypted image 183 takes roughly a checkered pattern, and therefore, if the frequency analysis such as FFT is conducted about the horizontal and vertical directions thereof, power of a frequency corresponding to a stripe cycle becomes conspicuously strong.

Figure 32:
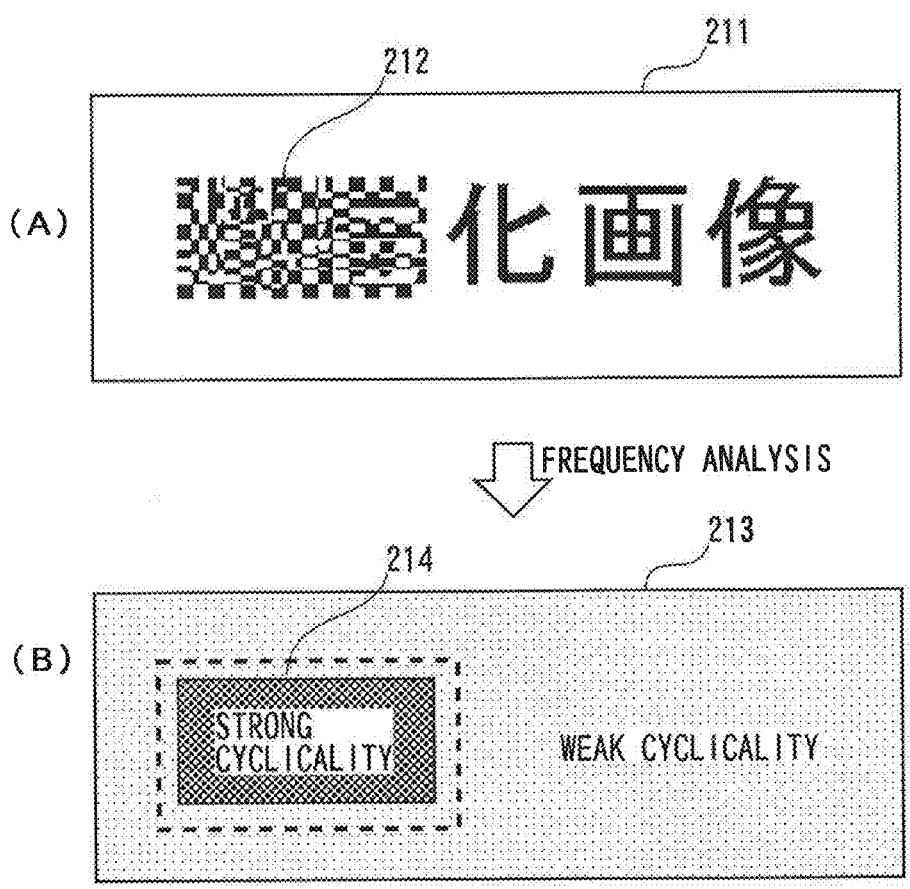
FIG. 32 An explanatory diagram of an encryption area detecting method.

FIG. 32 is an explanatory diagram of a method of detecting the encryption area. As illustrated in (A) of FIG. 32, when performing the frequency analysis about an encrypted image 211, as shown in (B), a power intensive area of a certain frequency is expressed as a [strong cyclicality] 214 (a frequency of an integral multiple of the former frequency). The cyclicality of the pixel distribution within the encryption area tends to be strong, and it is therefore feasible to detect a rough encryption area and a stripped pattern cycle.

The discussion gets back to the illustration in FIG. 31. The encrypted position detecting unit 143, after the encryption area detecting unit 201 has specified a rough encryption area, detects the encryption area more precisely, and simultaneously the minute positions of the respective pixels in the encryption area. Such a method can be considered as one example of the positional detection that the border position (offset) of the pixel-value conversion is obtained from the stripped pattern cycle acquired by the encryption area detecting unit 201 and from an absolute pixel value difference distribution, and the areas exhibiting a comparatively large absolute pixel value difference are further narrowed down therefrom. Moreover, in the same way as by the encrypted position detecting unit 143 in the first mode, the detection of the encrypted position can involve using the Hough transform.

Figure 33:
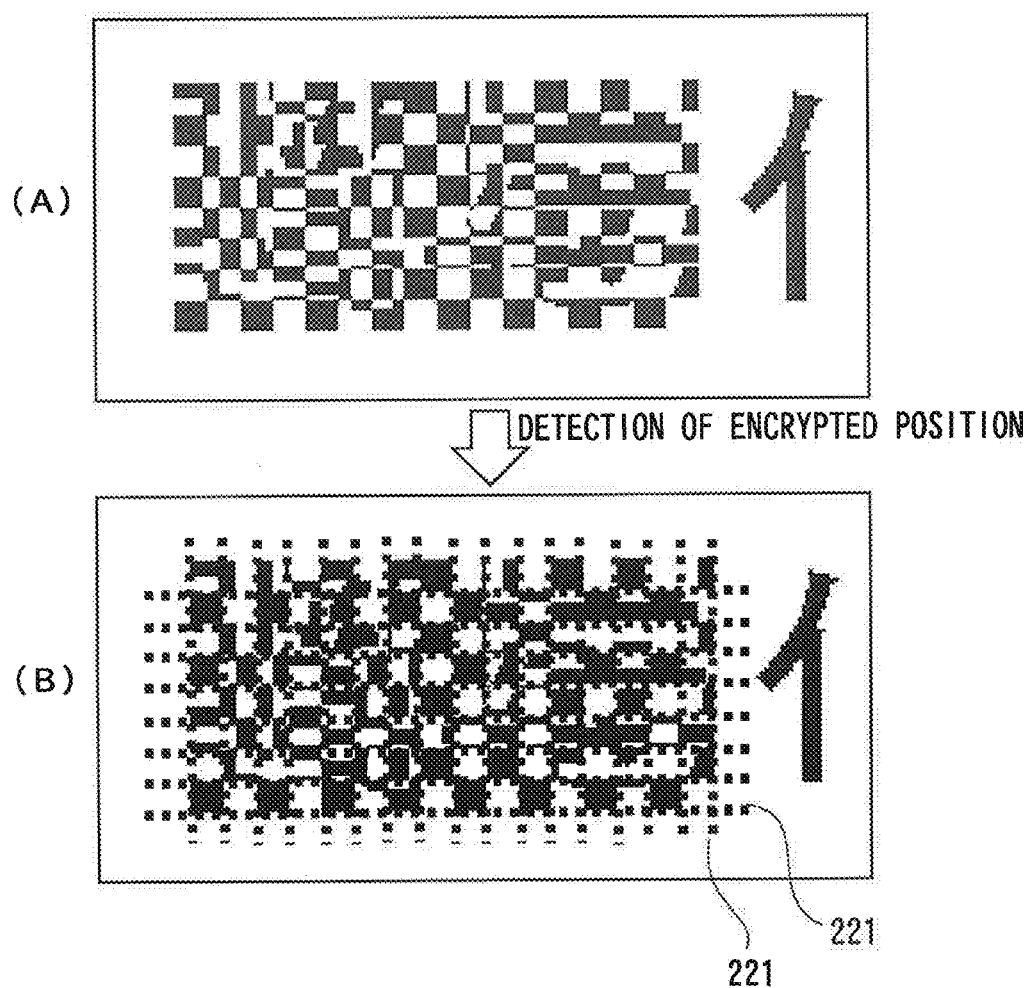
FIG. 33 An explanatory diagram of a method of detecting an encrypted position (in a horizontal direction).

FIG. 33 is an explanatory diagram of the method of detecting the encrypted position (in the horizontal direction). As stated above, when the encryption area detecting process described above is conducted respectively in the horizontal direction and in the vertical direction, as illustrated in FIG. 33, an encrypted position 221 is detected.

The discussion gets back to the illustration in FIG. 31. The image inverting unit 144 generates a decrypted image by executing the same method as in the first mode in a way that employs the information on the encrypted position and a decryption key.

The check mark detecting unit 204 tries to detect the check mark from the decrypted image decrypted by the image inverting unit 144. The detecting method is the same as the marker detecting process in the first mode, and hence its explanation is omitted. Then, when the check mark is detected, the decrypted image is output, and the process is terminated. When the check mark is not detected, the encrypted position correcting unit 205 corrects the encrypted position, and, till the check mark is detected or till a designated standard is satisfied, the decrypting process (image inverting process) is redone.

Figure 34:
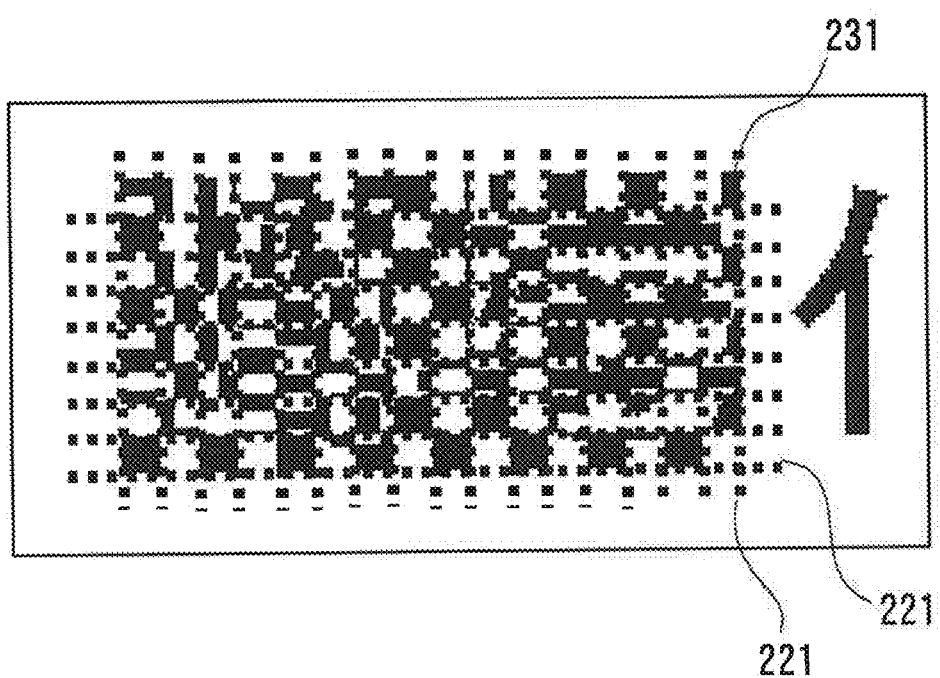
FIG. 34 A diagram showing an example of mis-detecting the encrypted position.

FIG. 34 is a diagram showing an example of how the encrypted position is mis-detected. As illustrated in FIG. 34, there is considered a case in which an edge of the encrypted image is overlooked (a fail-in-detection line 231). Such being the case, when failing to detect the check mark 221, lines representing the encrypted position are added to or deleted from the left right edge and the upper lower edge, and the image inverting process is executed, thus examining in various ways whether the check mark 221 is detected or not. If the check mark 221 can not be detected by adding or deleting the lines in whatever manner, the process is ended without outputting the decrypted image. What has been discussed so far is the description about the second mode to which the present invention is applied.

Next, a third mode to which the present invention is applied will be described. The third mode of the present invention entails encrypting the image and decrypting the encrypted image by use of both of the positioning marker for specifying the encryption area that is exemplified in the first mode and the check mark for determining the validity of the decrypted image in the second mode. An image decryption error caused when the valid decryption key is inputted can be reduced by use of the two types of markers such as the position marker for the positional detection and the check mark for checking the decrypted image.

Figure 35:
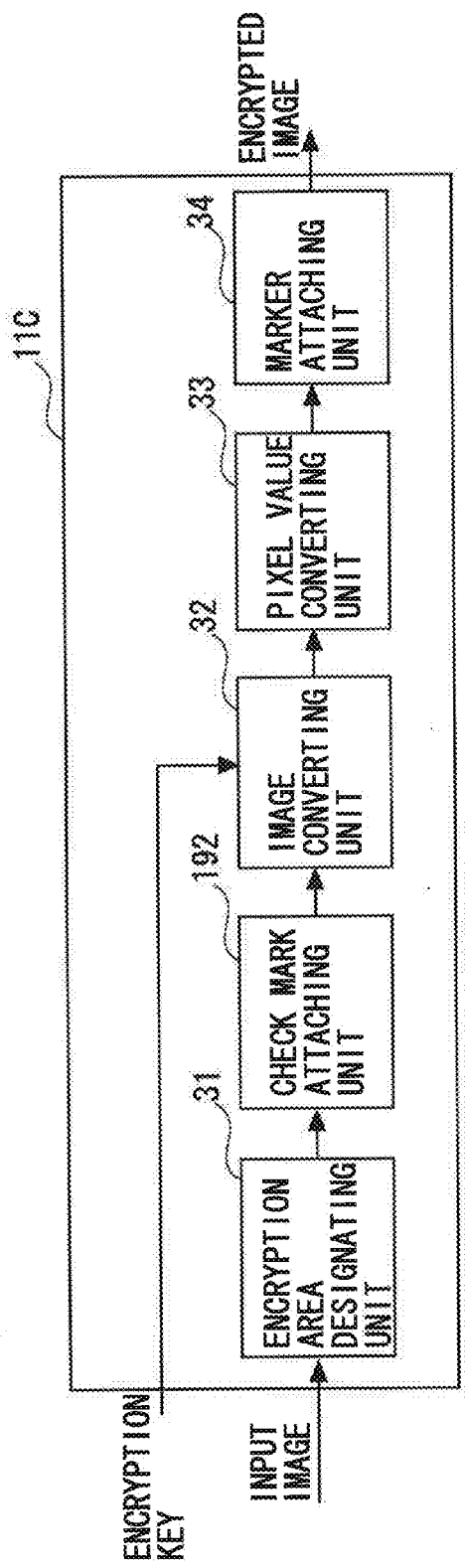
FIG. 35 A diagram showing an outline of the encrypting process in a third mode.

FIG. 35 is a diagram showing an outline of the encrypting process in the third mode. In FIG. 35, the encrypting unit 11C includes the encryption area determining unit 31, a check mark attaching unit 192, the image converting unit 32, the pixel value converting unit 33 and the marker attaching unit 34.

To begin with, the encryption area determining unit 31 selects the image area to be encrypted, and the check mark attaching unit 192 attaches the check mark for verifying the decryption by the same method as in the second mode. After attaching the check mark, the image converting unit 32 and the pixel value converting unit 33 encrypt the image by executing the image process by the same method as in the first and second modes, and the marker attaching unit 34 attaches the positioning marker for detecting the encryption area by the same method as in the first mode. The contents of the respective processes are the same as those in the first or second mode, and hence their explanations are omitted.

Figure 36:
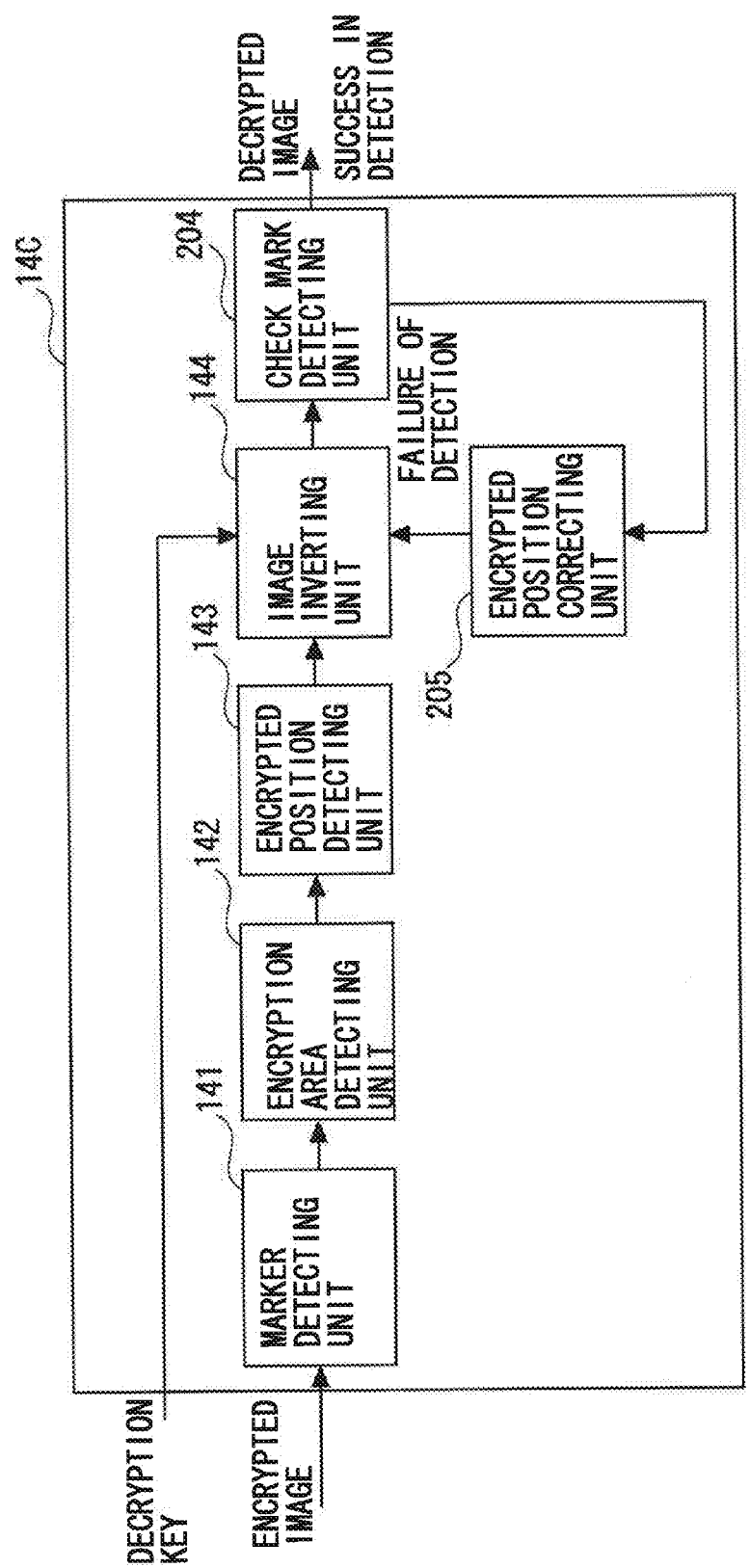
FIG. 36 A diagram showing an outline of the decrypting process in the third mode.

FIG. 36 is a diagram showing an outline of the decrypting process in the third mode. In FIG. 36, the decrypting unit 14C includes the marker detecting unit 141, the encryption area detecting unit 142, the encrypted position detecting unit 143, the image inverting unit 144, the check mark detecting unit 204 and the encrypted position correcting unit 205.

At first, the marker detecting unit 141 detects the positioning marker by the same method as in the first mode, and subsequently the encryption area detecting unit 142 detects the encryption area by the same method as in the first mode. Moreover, the encrypted position detecting unit 143 detects the minute positions of the respective pixels in the encryption area by the same method as in the first mode. Furthermore, the respective processing procedures executed by the check mark detecting unit 204 and the encrypted position correcting unit 205 are the same as those in the second mode, and hence their explanations are omitted. What has been discussed so far is the description about the third mode to which the present invention is applied.

What is claimed is:

1. An electronic document encrypting system including a processor, comprising:
a keyword detecting unit configured to detect a keyword contained in an electronic document by comparing a character string in the electronic document with the keyword defined as a predetermined character string;
an encryption area extracting unit configured to extract an encryption target area, which is associated with the keyword detected by said keyword detecting unit but excludes the character string of the detected keyword, from the electronic document;
a digital image generating unit configured to generate a digital image of the encryption target area extracted by said encryption area extracting unit in the electronic document;
an encrypting unit configured to encrypt the digital image generated by said digital image generating unit, by converting pixels of the digital image on the basis of an encryption key; and
an encrypted electronic document generating unit configured to generate an encrypted electronic document, based on the electronic document, by replacing the encryption target area extracted by said encryption area extracting unit with the encrypted digital image encrypted by said encrypting unit.

2. An electronic document encrypting system according to claim 1, wherein said encryption area extracting unit extracts a first area becoming the encryption target area and a second area different from the first area,
said digital image generating unit generates a first digital image related to the first area extracted by said encryption area extracting unit and a second digital image related to the extracted second area, and
said encrypting unit encrypts the digital image related to the first area and the digital image related to the second area on the basis of first and second encryption keys, respectively, the first and second encryption keys being different from each other.

3. A non-transitory readable-by-computer recording medium recorded with an electronic document encrypting program for making a computer function as:
keyword detecting means detecting a keyword contained in an electronic document by comparing a character string in the electronic document with the keyword defined as a predetermined character string;

encryption area extracting means extracting an encryption target area, which is associated with the keyword detected by said keyword detecting means but excludes the character string of the detected keyword, from the electronic document;

digital image generating means generating a digital image of the encryption target area extracted by said encryption area extracting means in the electronic document;

encrypting means encrypting the digital image generated by said digital image generating means, by converting pixels of the digital image on the basis of an encryption key; and encrypted electronic document generating means generating an encrypted electronic document, based on the electronic document, by replacing the encryption target area extracted by said encryption area extracting means with the encrypted digital image encrypted by said encrypting means.

4. A non-transitory readable-by-computer recording medium recorded with an electronic document encrypting program according to claim 3, wherein said encryption area extracting means extracts a first area becoming the encryption target area and a second area different from the first area, said digital image generating means generates a first digital image related to the first area extracted by said encryption area extracting means and a second digital image related to the extracted second area, and said encrypting means encrypts the digital image related to the first area and the digital image related to the second area on the basis of first and second encryption keys, respectively, the first and second encryption keys being different from each other.

5. An electronic document encrypting method by which a computer executes:

detecting a keyword contained in an electronic document by comparing a character string in the electronic document with the keyword defined as a predetermined character string;

extracting an encryption target area, which is associated with the keyword detected by said detecting but excludes the character string of the detected keyword, from the electronic document;

generating a digital image of the encryption target area extracted in said extracting in the electronic document;

encrypting the digital image generated in said generating, by converting pixels of the digital image on the basis of an encryption key; and generating an encrypted electronic document, based on the electronic document, by replacing the extracted encryption target area with the encrypted digital image encrypted in said encrypting.

6. An electronic document encrypting method according to claim 5, wherein said extracting involves extracting a first area becoming the encryption target area and second area different from the first area, said digital image generating involves generating a first digital image related to the first area extracted by said extracting and a second digital image related to the extracted second area, and said encrypting involves encrypting the digital image related to the first area and the digital image related to the second area on the basis of first and second encryption keys, respectively, the first and second encryption keys being different from each other.

* * * * *